(12) United States Patent
Aihara et al.

(10) Patent No.: US 10,036,500 B2
(45) Date of Patent: Jul. 31, 2018

(54) HOSE CLAMP

(71) Applicant: PIOLAX, INC., Yokohama-shi (JP)

(72) Inventors: Masahiro Aihara, Yokohama (JP); Ken Sodeyama, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 186 days.

(21) Appl. No.: 15/115,632

(22) PCT Filed: Feb. 4, 2015

(86) PCT No.: PCT/JP2015/053042
§ 371 (c)(1),
(2) Date: Jul. 29, 2016

(87) PCT Pub. No.: WO2015/119133
PCT Pub. Date: Aug. 13, 2015

(65) Prior Publication Data
US 2017/0167650 A1    Jun. 15, 2017

(30) Foreign Application Priority Data
Feb. 4, 2014    (JP) .................................. 2014-019100

(51) Int. Cl.
*F16L 33/02*    (2006.01)
*F16L 33/025*    (2006.01)

(52) U.S. Cl.
CPC ........... *F16L 33/025* (2013.01); *F16L 33/021* (2013.01); *F16L 33/023* (2013.01)

(58) Field of Classification Search
CPC ......... F16L 33/02; F16L 33/03; F16L 33/035; F16L 33/025; F16L 33/023; F16L 33/021
See application file for complete search history.

(56) References Cited

U.S. PATENT DOCUMENTS

| 5,414,905 | A | * | 5/1995 | Kimura | .................... | F16L 33/03 24/20 R |
| 5,819,376 | A | * | 10/1998 | Kovalsky | ................ | F16L 33/03 24/23 R |

(Continued)

FOREIGN PATENT DOCUMENTS

| JP | S 51-59919 U | 5/1976 |
| JP | 2008-256142 A | 10/2008 |

(Continued)

OTHER PUBLICATIONS

International Search Report (ISR) (PCT Form PCT/ISA/210), in PCT/JP2015/053042, dated Apr. 21, 2015.

*Primary Examiner* — Jack W Lavinder
(74) *Attorney, Agent, or Firm* — McGinn IP Law Group, PLLC

(57) ABSTRACT

According to one embodiment, a hose clamp has a leaf spring body, a slit and a first knob piece at one end, and an insertion piece and a second knob piece at the other end. An interlocking piece is formed in the first knob piece, and an engaging holding part is formed in the second knob piece. When the hose clamp is viewed from the outside in the radial direction while the leaf spring body is in a free state of being compressed, the first knob piece and the second knob piece are extended outward in the width direction so as to be separated.

9 Claims, 22 Drawing Sheets

(56) References Cited

U.S. PATENT DOCUMENTS

| | | | | |
|---|---|---|---|---|
| 5,855,044 | A * | 1/1999 | Cradduck | F16L 33/03 24/19 |
| 6,038,744 | A * | 3/2000 | Zielinski | F16L 33/03 24/20 EE |
| 6,098,251 | A * | 8/2000 | Zielinski | F16L 33/03 24/20 EE |
| 6,192,555 | B1 * | 2/2001 | Nakamura | F16L 33/03 24/20 CW |
| 6,473,943 | B1 * | 11/2002 | Thacker | B65D 63/02 24/20 EE |
| 8,087,703 | B2 * | 1/2012 | Kumakawa | F16L 23/04 24/20 R |
| 8,695,172 | B2 * | 4/2014 | Nagai | F16L 33/03 24/20 EE |
| 8,850,664 | B2 * | 10/2014 | Nakamura | F16L 33/03 24/20 CW |
| 2010/0083472 | A1 * | 4/2010 | Nakamura | F16L 33/03 24/16 R |
| 2012/0159743 | A1 | 6/2012 | Nagai et al. | |

FOREIGN PATENT DOCUMENTS

| | | |
|---|---|---|
| JP | 2012-107755 A | 6/2012 |
| WO | WO 2010-092702 A1 | 8/2010 |
| WO | WO 2011/033932 A1 | 3/2011 |

* cited by examiner

HOSE CLAMP

TECHNICAL FIELD

The present invention relates to hose clamps used when connecting, for example, automobile pipes with the use of a hose.

BACKGROUND ART

To connect automobile pipes with a hose, end portions of the pipes are covered with a flexible hose, and the outer circumference of the hose is tightened with a hose clamp, whereby the pipes are fixed to the hose.

For example, Patent Literature 1 describes a hose clamp that includes a leaf spring body having an annular shape. The leaf spring body includes at a one end portion a slit along the circumferential direction and an arch-shaped first tab piece protruding in the radial outer direction, and at the other-end portion an insertion piece arranged to be inserted into the slit to slide in the circumferential direction, and a second tab piece protruding in the radial outer direction from an end portion the insertion piece. The first tab piece includes a hook-shaped engaging piece extending from the inner side of the arch-shaped first tab piece toward the second tab piece. The second tab piece includes a stopper portion arranged to hold, when the engaging piece is engaged with the stopper portion, the state of the engagement.

By grasping to make both of the tab pieces approach each other in the circumferential direction with the use of a tool such as pliers, and engaging the engaging piece of the first tab piece with the second tab piece to hold the engagement with the stopper portion, the leaf spring body can be maintained in the radially expanded state. By disposing the hose clamp in this state on the outer circumference of the hose, and then making the pair of tab pieces approach each other in the circumferential direction to disengage the hook-shaped engaging piece from the stopper portion of the second tab piece, the leaf spring body flexibly returns and tightens to fix the hose. When the leaf spring body is radially expanded from a free state or when the leaf spring body is reduced in diameter from the radially expanded state, the insertion piece slides in the slit while the hook-shaped engaging piece moves so as to pass by the insertion piece.

CITATION LIST

Patent Literature

Patent Literature 1
WO-2010-092702-A

SUMMARY OF THE INVENTION

Problem that the Invention is to Solve

Automobile pipes are often disposed in sites with relatively tight space such as an engine compartment, the periphery of a fuel tank, and underfloor space, which is likely to put limitations in laying out the automobile pipes. For this reason, also hose clamps for connecting automobile pipes need to be downsized.

However, in the hose clamp of Patent Literature 1, when the plate width of the leaf spring body is reduced to downsize the hose clamp, the slit width of the first tab piece becomes small. When the slit width becomes small, the clearance between the engaging piece and the insertion piece that is necessary for the hook-shaped engaging piece to move so as to pass by the insertion piece when the leaf spring body is radially expanded or reduced cannot be secured. Accordingly, the engaging piece itself needs to be reduced in width, resulting in reduced strength of the engaging piece, which could cause the engaging piece disenabled to reliably maintain the engaging state with the second tab piece.

The object of the present invention is to provide a hose clamp that can be downsized by reducing the width of a leaf spring body while having the strength of an engaging piece and the like sufficiently maintained.

Means for Solving the Problem

In order to solve the problem described above, one embodiment of the present invention provides
  a hose clamp including a leaf spring body that is bent to have an annular shape,
  wherein a one end portion of the leaf spring body includes:
    a slit formed along a circumferential direction; and
    a first tab piece bent in a radial outer direction,
  wherein the other-end portion of the leaf spring body includes:
    an insertion piece configured to be inserted into the slit and slidable in the circumferential direction in the slit; and
    a second tab piece bent in the radial outer direction from an end portion of the insertion piece and facing the first tab piece,
  wherein the leaf spring body is configured to be radially expanded from a free state where the leaf spring body is reduced in diameter, by making the first tab piece and the second tab piece approach each other against an elastic force of the leaf spring body,
  wherein the first tab piece includes:
    an engaging piece that extends in the circumferential direction from the first tab piece toward the second tab piece, and includes a locking portion that protrudes in a width direction of the leaf spring body, and is engageable with a surface of the second tab piece that is opposite to the surface facing the first tab piece,
  wherein the second tab piece includes:
    an engagement holding portion that holds an engaged state when the locking portion of the engaging piece is engaged with the engagement holding portion, and is disposed on the surface of the second tab piece that is opposite to the surface facing the first tab piece, and
  wherein, when viewed from the radial outer direction in the free state where the leaf spring body is reduced in diameter, at least one of the first tab piece, the second tab piece and the engaging piece is bent at an angle inclined with respect to a direction perpendicular to a widthwise center line of the leaf spring body and extends outward in the width direction, so that a side surface of the engaging piece closer to the widthwise center line and a side surface of the second tab piece around the engagement holding portion closer to the widthwise center line are separated from each other.

There may be provided the hose clamp
  wherein, when viewed from the radial outer direction in the free state where the leaf spring body is reduced in diameter, at least one of the first tab piece and the second tab piece is bent at the angle inclined to the direction perpendicular to the widthwise center line of the leaf spring body, and the locking portion of the engaging piece and the engagement holding portion extend outward in the width direction to be separated from each other.

There may be provided the hose clamp wherein, when viewed from the radial outer direction in the free state where the leaf spring body is reduced in diameter, the engaging piece is bent at the angle inclined to the direction perpendicular to the widthwise center line of the leaf spring body, and the locking portion of the engaging piece and the engagement holding portion extend outward in the width direction to be separated from each other.

There may be provided the hose clamp wherein the inclined angle of the at least one of the first tab piece, the second tab piece and the engaging piece is set such that the engaging piece does not protrude from an outer edge on a one-side portion of the leaf spring body in the width direction.

There may be provided the hose clamp wherein the first tab piece and the second tab piece are bent at the same inclined angle inclined to the direction perpendicular to the widthwise center line of the leaf spring body.

There may be provided the hose clamp wherein the second tab piece is bent at the angle inclined to the direction perpendicular to the widthwise center line of the leaf spring body, and the engagement holding portion of the second tab piece includes one of a concave portion and a hole.

Another aspect of the present invention provides a hose clamp including a leaf spring body that is bent to have an annular shape,
wherein a one end portion of the leaf spring body includes:
 a slit formed along a circumferential direction; and
 a first tab piece bent in a radial outer direction,
wherein the other-end portion of the leaf spring body includes:
 an insertion piece configured to be inserted into the slit and slidable in the circumferential direction in the slit; and
 a second tab piece bent in the radial outer direction from an end portion of the insertion piece and facing the first tab piece,
wherein the leaf spring body is configured to be radially expanded from a free state where the leaf spring body is reduced in diameter, by making the first tab piece and the second tab piece approach each other against an elastic force of the leaf spring body,
wherein the other-end portion of the leaf spring body further includes:
 an engaging piece including a locking portion configured to be engaged with the first tab piece,
wherein the first tab piece includes:
 an engagement holding portion configured to hold an engaged state when the locking portion of the engaging piece is engaged with the engagement holding portion, and
wherein, when viewed from the radial outer direction in the free state where the leaf spring body is reduced in diameter, at least one of the first tab piece and the second tab piece is bent at an angle inclined with respect to a direction perpendicular to a widthwise center line of the leaf spring body.

There may be provided the hose clamp wherein a part of the insertion piece disposed at the other-end portion of the leaf spring body is erected to provide the engaging piece that includes the locking portion at its distal end portion, and
wherein the engagement holding portion with which the locking portion is engaged is disposed on a surface of the first tab piece that is opposite to a surface facing the second tab piece.

There may be provided the hose clamp wherein, when viewed from the radial outer direction in the free state where the leaf spring body is reduced in diameter, the engaging piece is disposed on a side portion that is opposite in the width direction of the leaf spring body to a portion of the first tab piece where the engagement holding portion is disposed.

Advantageous Effects of Invention

According to the present invention, the hose clamp can be maintained in the radially expanded state while both the end portions of the leaf spring body are warped in the width direction. Because the engagement state can be maintained by the engagement holding portion by making the first tab piece and second tab piece approach each other against elastic force from the free state where the leaf spring body is reduced in diameter, moving the engaging piece in the width direction, and engaging the locking portion with the opposite surface of the second tab piece. In this state, the insertion piece slides in the slit by elastic restoring force of the leaf spring body to make the leaf spring body reduced in diameter by disposing the hose clamp on the outer circumference of a hose, pinching the first tab piece and the second tab piece with the use of a tool such as pliers to make them approach each other, displacing the locking portion of the engaging piece from the engagement holding portion in the width direction to disengage the locking portion of the engaging piece from the engagement holding portion, and then separating the first tab piece from the second tab piece. Accordingly, the hose can be tightened to be fixed to a pipe or the like.

When viewed from the radial outer direction in the free state where the leaf spring body is reduced in diameter, at least one of the first tab piece, the second tab piece and the engaging piece is bent at the inclined angle with respect to the direction perpendicular to the widthwise center line of the leaf spring body, and extends outward in the width direction, so that the side surface of the engaging piece closer to the widthwise center line and the side surface of the second tab piece around the engagement holding portion closer to the widthwise center line are separated from each other. Accordingly, even when the leaf spring body is reduced in width to reduce the width of the slit where the insertion piece slidably moves, the clearance between the side surface of the second tab piece around the engagement holding portion and the side surface of the engaging piece that passes by it can be maintained, and the width of the engaging piece can be secured to obtain a sufficient strength. As a result, while the clamp can be downsized, the locking portion of the engaging piece is engaged with the engagement holding portion, which allows the leaf spring body to be reliably maintained in the radially expanded state.

In the hose clamp according to the another aspect of the present invention, the first tab piece and the second tab piece are bent at the inclined angle with respect to the direction perpendicular to the widthwise center line of the leaf spring body, when the first tab piece and the second tab piece are pinched and made to approach each other from the state where the leaf spring body is radially expanded by engaging the engaging piece with the engagement holding portion, the first tab piece and the second tab piece move in directions away from each other in the width direction of the leaf spring body. Accordingly, the locking portion of the engaging piece can be disengaged smoothly from the engagement holding portion without providing a structure to assist the disengagement of the locking portion of the engaging piece from the engagement holding portion inside of the slit. As a result, the leaf spring body can be reduced in width while the width of the engaging piece can be secured to obtain a sufficient strength, so that while the clamp can be downsized, the locking portion of the engaging piece is engaged with the engagement holding portion, which allows the leaf spring body to be reliably maintained in the radially expanded state.

MODE FOR CARRYING OUT THE INVENTION

A hose clamp according to one embodiment of the present invention will be described referring to FIGS. 1 to 10.

Figure 1:
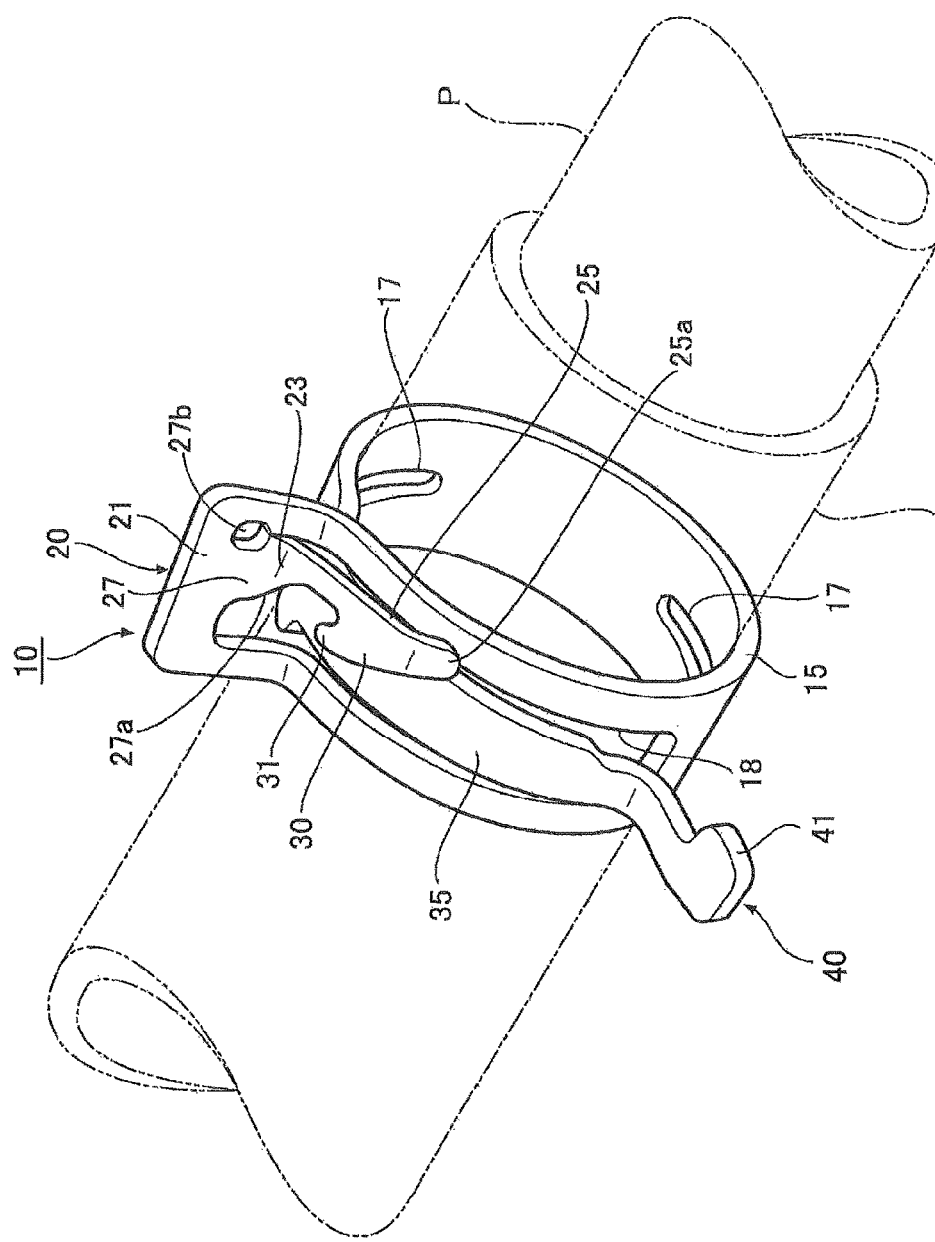
FIG. 1 is a perspective view of a hose clamp according to one embodiment of the present invention in a reduced diameter state.
Figure 4:
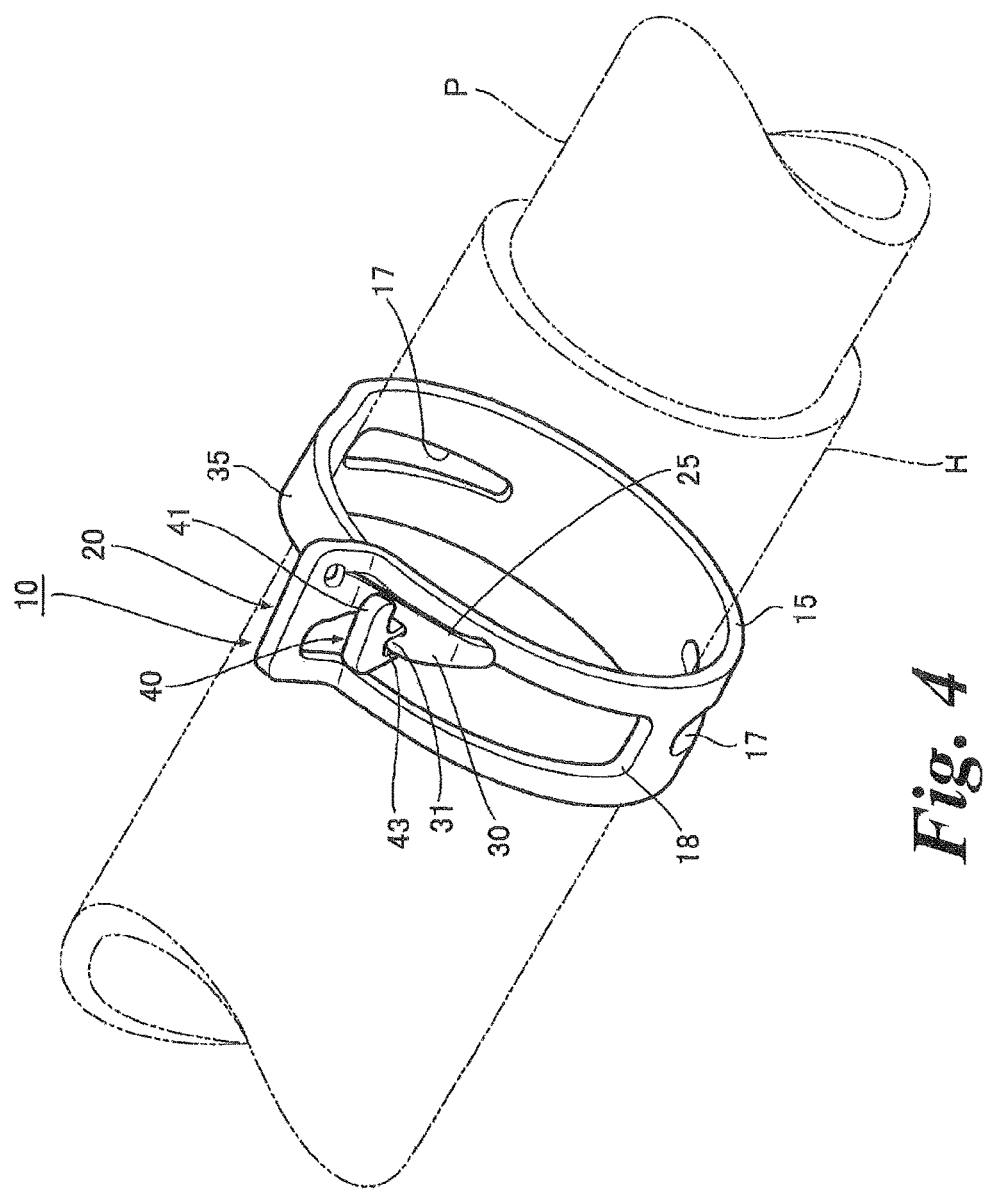
FIG. 4 is a perspective view of the hose clamp in a radially expanded state where an engaging piece is engaged with a second tab piece.

As shown in FIGS. 1 and 4, a hose clamp 10 (clamp 10) according to the present invention is used for tightening the outer circumference of a hose H that covers a one end portion of a pipe P having a pipe shape, and fixing the hose H to the pipe P.

Figure 3:
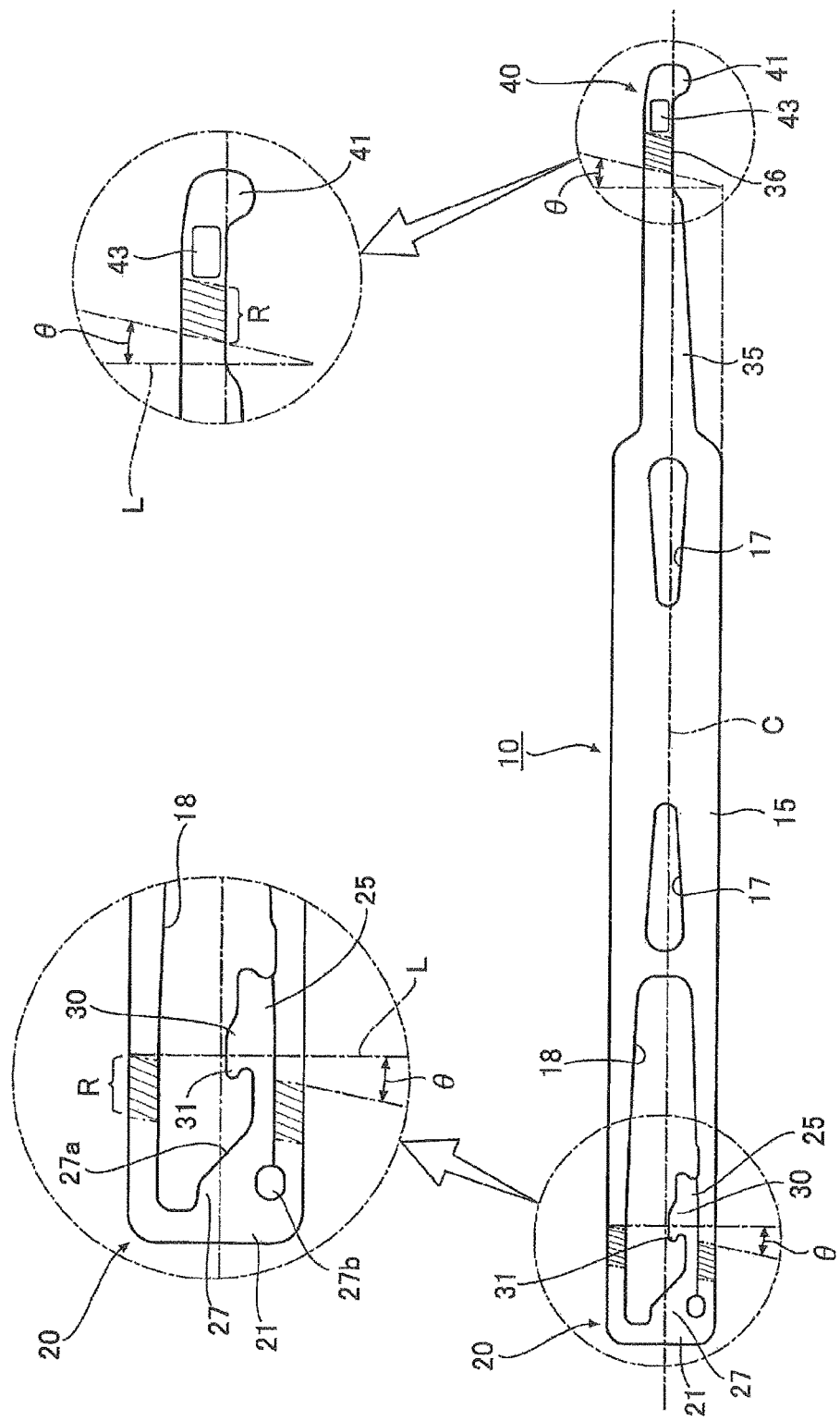
FIG. 3 is an explanatory view of the hose clamp developed into a planar shape.

The clamp 10 according to the present embodiment is made by punching a predetermined shaped piece out of a belt-like metallic plate as shown in FIG. 3, and bending the piece, and includes a leaf spring body 15 that is curved into an annular shape.

At the one end portion of the leaf spring body 15, a slit 18 having a predetermined length along the circumferential direction is provided. The one end portion of the leaf spring body 15 is bent at the distal end side of the slit 18 to form a first tab piece 20. The first tab 20 protrudes in the radial outer direction, and has an arch shape.

An insertion piece 35 is provided to the other-end portion of the leaf spring body 15, the insertion piece 35 being arranged to be inserted into the slit 18 to slide in the circumferential direction in the slit 18 when the leaf spring body 15 is radially expanded or reduced. A portion of the insertion piece 35 that is slightly in front of the distal end portion is cut out until a position approximately coinciding with a widthwise center line C of the leaf spring body 15, whereby a one-side portion 36 oriented toward the engaging piece 25 is provided.

An end portion of the insertion piece 35 including the one-side portion 36 is bent in the radial outer direction of the leaf spring body 15, whereby a second tab piece 40 facing the first tab piece 20 is provided. A protruding piece 41 protrudes from the protruding distal end portion of the second tab piece 40 toward one side in the width direction of the leaf spring body 15 (in a direction to approach the engaging piece 25), whereby the second tab piece 40 is made easier to pinch with the use of a tool T.

The leaf spring body 15 is arranged to be reduced in diameter while having its first tab piece 20 and second tab piece 40 separated from each other in the circumferential direction in a free state (see FIGS. 1 and 2) while being arranged to be radially expanded when the first tab piece 20 and second tab piece 40 are made to approach each other in the circumferential direction against elastic force of the leaf spring body 15 (see FIGS. 4 to 9). The leaf spring body 15 includes plural long holes 17 in its intermediate portion in the circumferential direction in order to make stress distribution uniform (see FIGS. 1 and 3).

Figure 2:
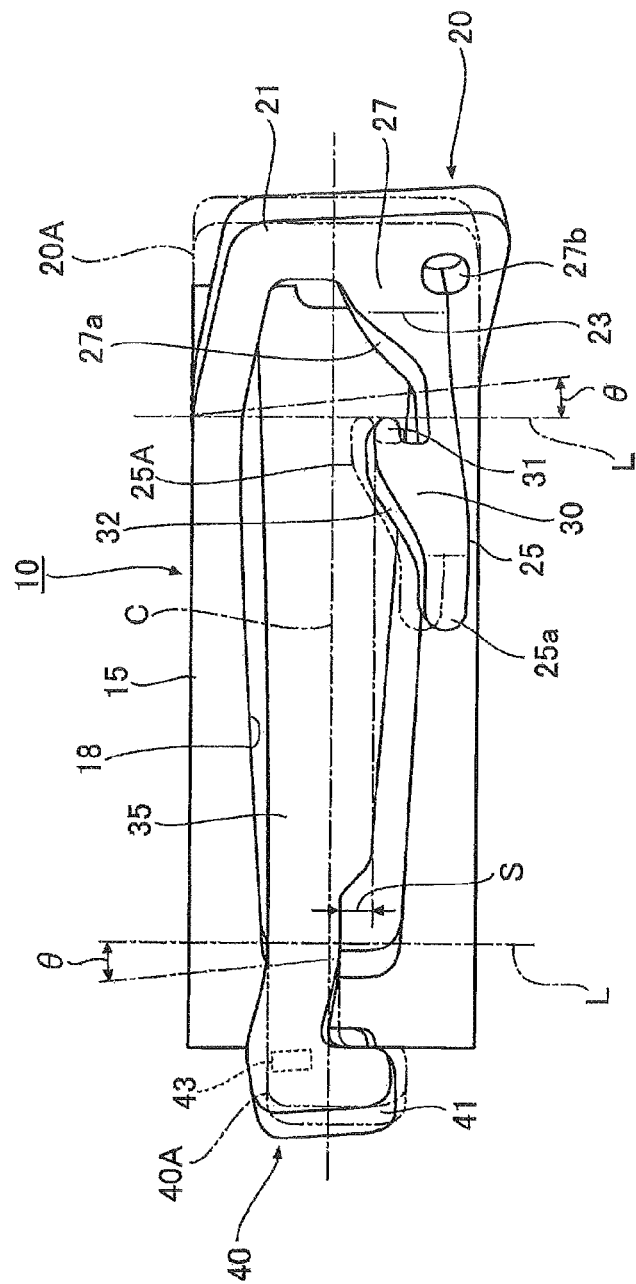
FIG. 2 is a plan view of the hose clamp in the reduced diameter state.
Figure 5:
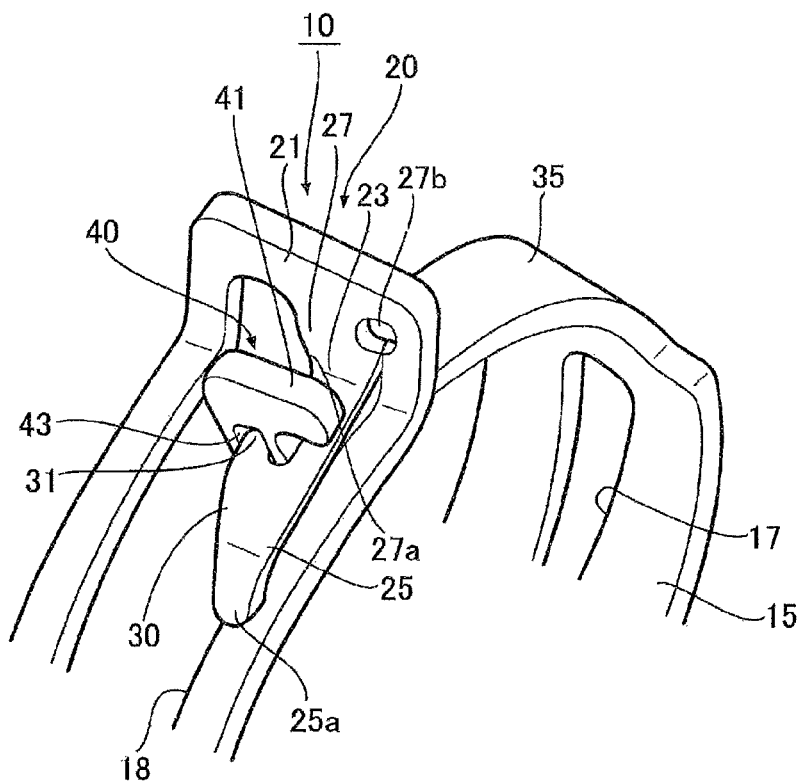
FIG. 5 is an enlarged perspective view of relevant components of the hose clamp in the radially expanded state.

As shown in FIGS. 1, 2 and 5, the first tab piece 20 includes an engaging piece 25 via a bent portion 23, the engaging piece 25 being arranged to be engaged with the second tab piece 40. To be specific, a base portion 27 extends from a position of the lower surface of an upper wall portion 21 of the arch-shaped first tab piece 20, the position being closer to a one-side portion in the width direction, and the engaging piece 25 extends from a lower end portion of the base portion 27 toward the second tab piece 40 in the circumferential direction via the bent portion 23.

Figure 6:
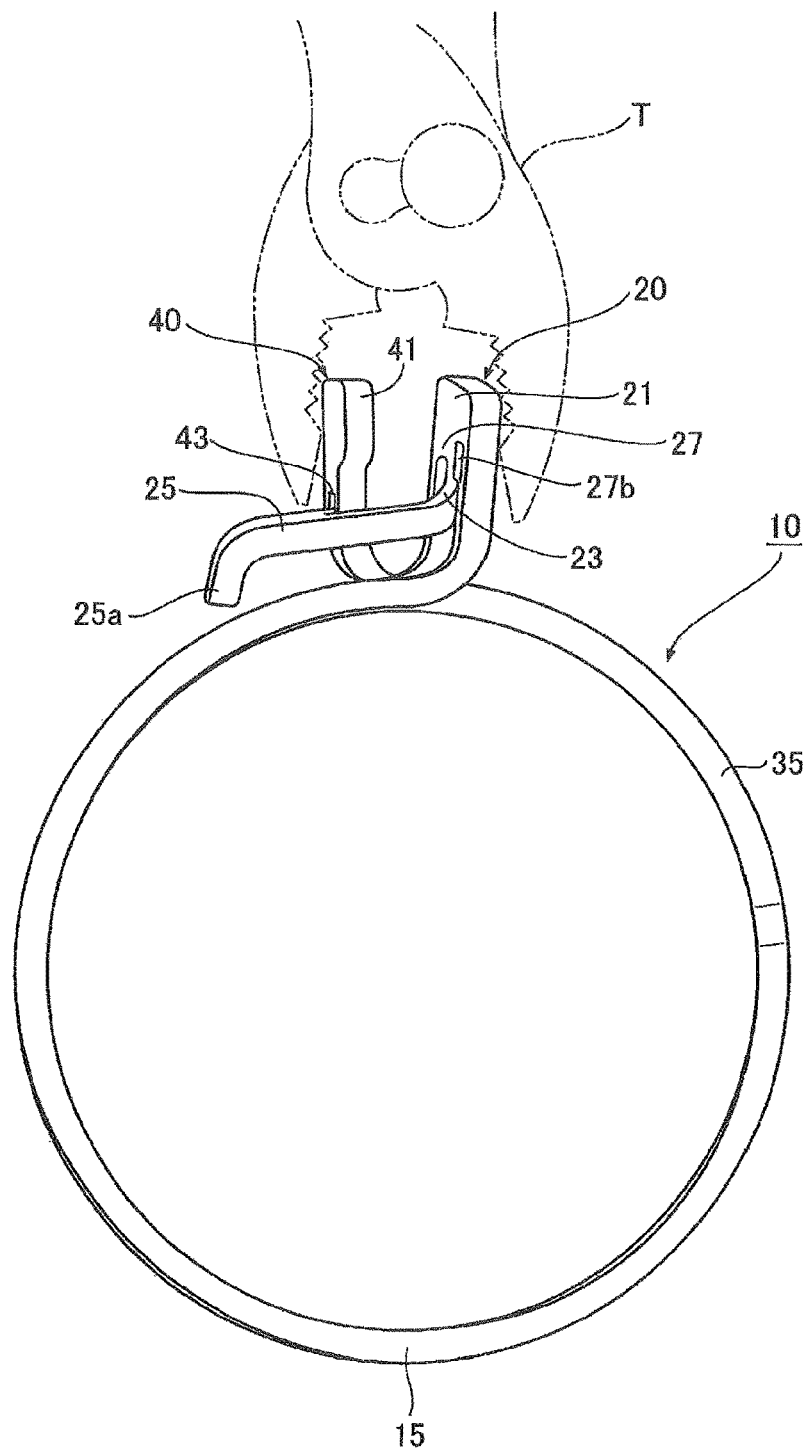
FIG. 6 is a front view of the hose clamp in the radially expanded state.

A forefront end portion 25a of the engaging piece 25 in the extending direction has a round arch shape (see FIG. 2), and a distal end portion of the engaging piece 25 including the forefront end portion 25a is bent toward the radial inner direction of the leaf spring body 15 (see FIG. 6), which can prevent the forefront end portion 25a of the engaging piece 25 from being pinched by mistake with the use of the tool T such as pliers and pincers (see FIG. 6).

A tapered portion 27a spreading in the width direction toward the first tab piece 20 is provided to the base portion 27 of the engaging piece 25 on the side edge closer to the widthwise center line of the leaf spring body 15 (see FIGS. 2 and 3). The tapered portion 27a defines a portion that is brought into contact with the second tab piece 40 to move the second tab piece 40 in the width direction so as to be separated from the engaging piece 25 when the first tab piece 20 and second tab piece 40 are made to approach each other from the state where the leaf spring body 15 is radially expanded (see FIGS. 5 and 7). The base portion 27 of the engaging piece 25 includes a through hole 27b, which allows the engaging piece 25 to be easily bent.

Figure 7:
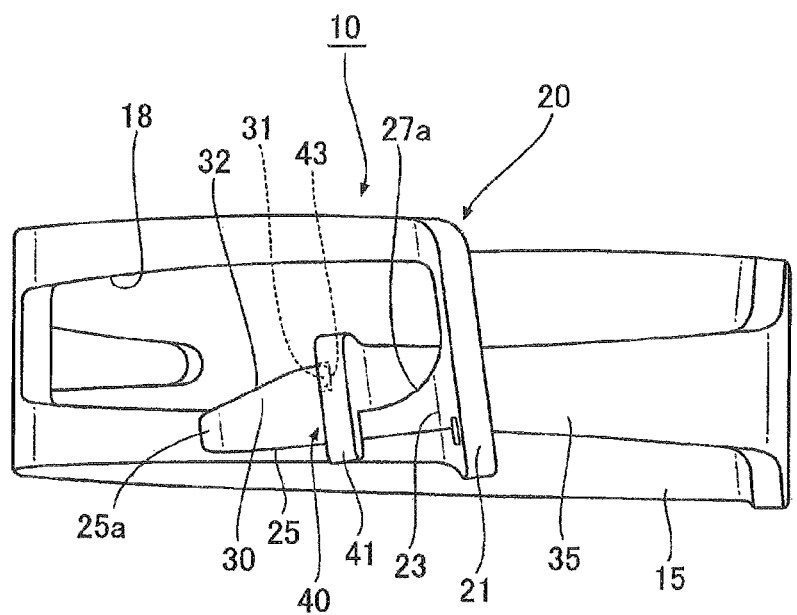
FIG. 7 is a plan view of the hose clamp in the radially expanded state.
Figure 8:
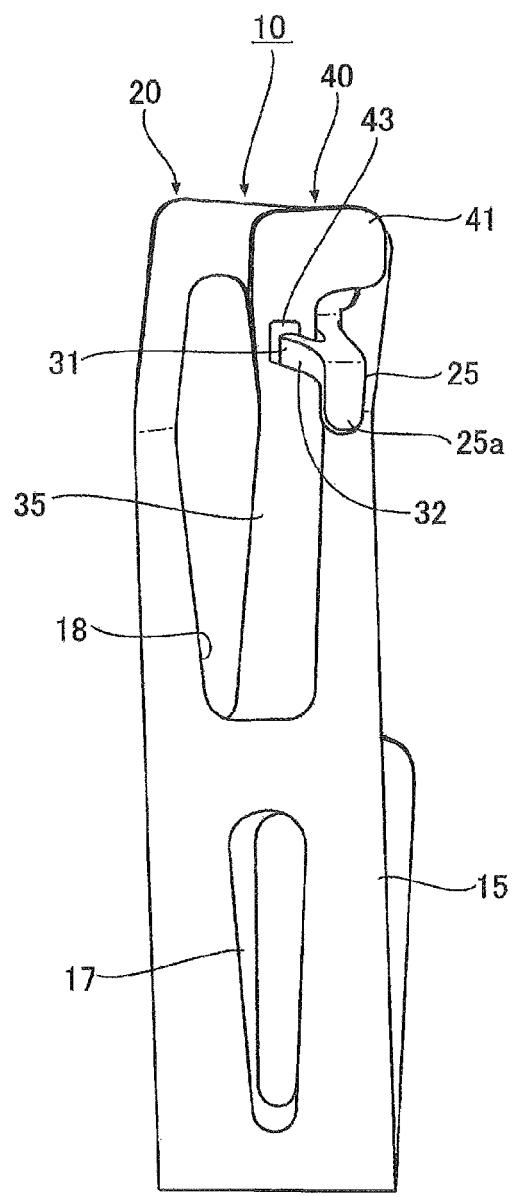
FIG. 8 is a left side view of the hose clamp in the radially expanded state.
Figure 9:
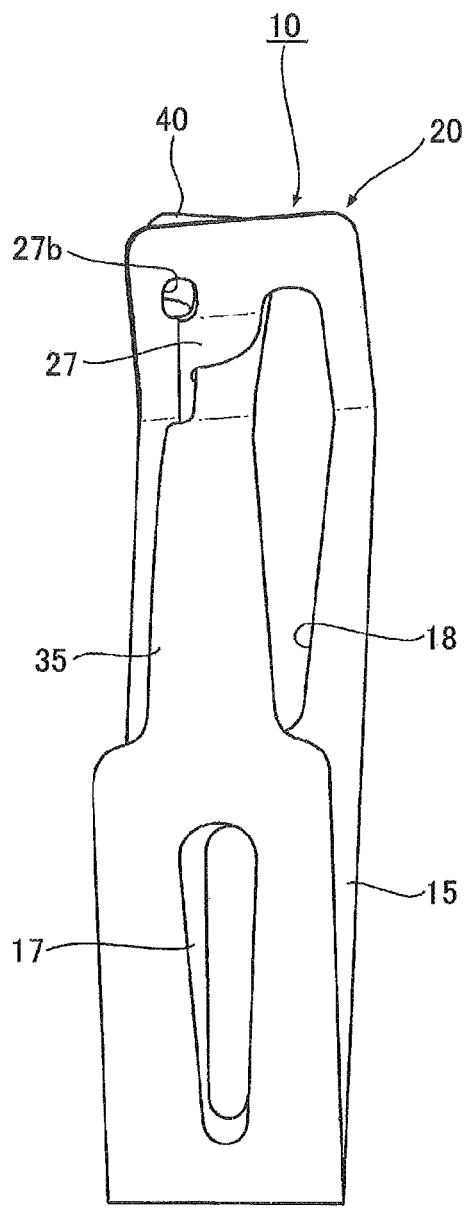
FIG. 9 is a right side view of the hose clamp in the radially expanded state.
Figure 10:
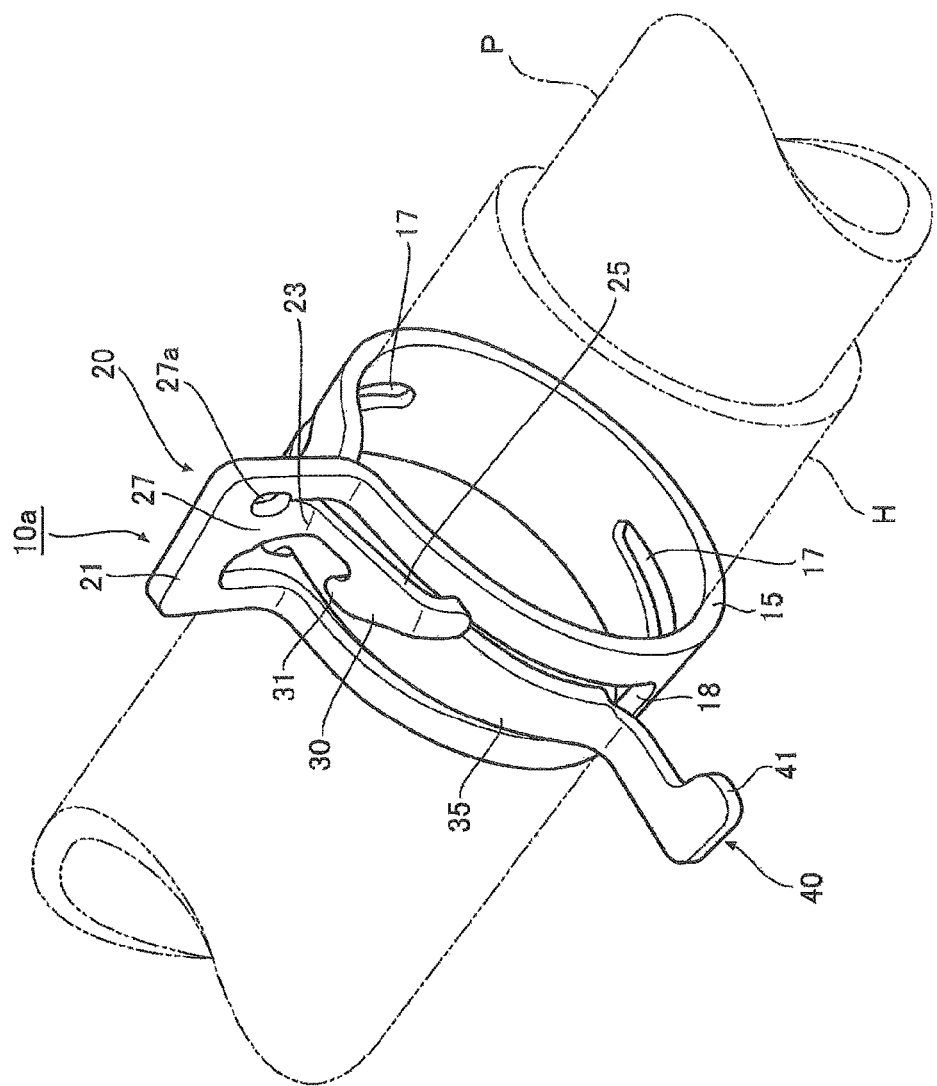
FIG. 10 is a perspective view of a hose clamp according to another embodiment of the present invention in a reduced diameter state.

A locking portion 30 is provided to the engaging piece 25 in the distal end portion in the extending direction, the locking portion 30 protruding into a hook shape in the width direction of the leaf spring body 15 and being engageable with a surface of the second tab piece 40 that is opposite to the surface facing the first tab piece 20 (see FIGS. 2, 5 and 7). An engaging protrusion 31 protrudes from a protruding end face of the locking portion 30 facing the first tab piece 20. As shown in FIG. 2, a side edge 32 of the locking portion 30 facing the second tab piece 40 has a tapered shape gradually narrowing toward the forefront end portion 25a.

As shown in FIGS. 5 to 8, the second tab piece 40 includes an engagement holding portion 43 that is a concave portion having a predetermined depth in the thickness direction of the second tab piece 40, and is disposed on the surface (outer surface) of the second tab piece 40 that is opposite to the surface facing the first tab piece 20. The engaging protrusion 31 of the locking portion 30 of the engaging piece 25 is engaged with the inner circumferential edge of the concaved engagement holding portion 43 while being held inside the concave portion of the engagement holding portion 43. Accordingly, the engagement state between the second tab piece 40 and the locking portion 30 of the engaging piece 25 can be maintained (see FIGS. 5 and 7). The engagement holding portion 43 may have a hole shape to pass through the second tab piece 40 in the thickness direction or a protruding shape to limit the movement of the locking portion 30 only when the engagement holding portion 43 has the shape to be able to maintain the engagement state between the second tab piece 40 and the locking portion 30. However, the above-described concave portion or a through hole are preferred.

As shown in FIG. 2, the inner surface of a portion of the second tab piece 40 where the engagement holding portion 43 is disposed is displaced in the width direction from the engaging protrusion 31 of the locking portion 30 of the above-described first tab piece 20, and disposed at a position where the inner surface does not overlap with the engaging protrusion 31 when viewed along the circumferential direction in the free state where the leaf spring body 15 is reduced in diameter.

The tab pieces 20 and 40 are made to approach each other in the circumferential direction while the leaf spring body 15 is made to warp in the width direction such that the engaging protrusion 31 matches with the engagement holding portion 43, and the engaging protrusion 31 is engaged with the engagement holding portion 43. Accordingly, the leaf spring body 15 can be maintained in the radially expanded state (see FIGS. 4 to 9).

When the tab pieces 20 and 40 are made to further approach each other in the circumferential direction by pinching with the use of the tool T while the state where the leaf spring body 15 is radially expanded is maintained by engaging the engaging protrusion 31 with the engagement holding portion 43, the engaging protrusion 31 is disengaged from the engagement holding portion 43, and the inner side of the portion of the second tab piece 40 where the engagement holding portion 43 is disposed is brought into slidably contact with the tapered portion 27a of the base portion 27 of the engaging piece 25, and the second tab piece 40 moves in the width direction to correct the warp of the leaf spring body 15 in the width direction. Thus, the inner side of the second tab piece 40 is disposed at a position not to overlap with the engaging piece 25 when viewed in the circumferential direction, and the tab pieces 20 and 40 are opened in a direction away from each other in this state, which allows the second tab piece 40 to pass by the engaging piece 25, and the insertion piece 35 to slide in the slit 18, whereby the leaf spring body 15 is reduced in diameter.

In the clamp 10, when viewed from the radial outer direction in the free state where the leaf spring body 15 is reduced in diameter as shown in FIG. 2, the first tab piece 20 and the second tab piece 40 are bent at an inclined angle that is not perpendicular to the widthwise center line C of the leaf spring body 15.

As shown in FIGS. 2 and 3, let L represent the direction perpendicular to the widthwise center line C of the leaf spring body 15, the first tab piece 20 and the second tab piece 40 of the clamp 10 are bent along the lines that are inclined at a predetermined angle θ with respect to the perpendicular direction L.

In FIG. 2, a first tab piece 20A, a second tab piece 40A, and an engaging piece 25A that would be obtained in a case where the first tab piece and the second tab piece are bent along the perpendicular direction L (bent at an angle perpendicular to the widthwise center line C of the leaf spring body 15) are indicated with virtual lines (the alternate long and two short dashes lines).

As described above, the first tab piece 20 and the second tab piece 40 are bent at the predetermined inclined angle θ with respect to the direction L perpendicular to the widthwise center line C of the leaf spring body 15, and extends outward in the width direction of the leaf spring body 15, so that the side surface of the engaging piece 25 closer to the widthwise center line C and the side surface of the second tab piece 40 around the engagement holding portion 43 closer to the widthwise center line C are separated from each other.

With this configuration, a clearance S between the inner surface (the surface facing the first tab piece 20) of the second tab piece 40 around the engagement holding portion 43 and the inner surface (the surface facing the second tab piece 40) of the engaging piece 25 that passes by it is sufficiently secured as shown in FIG. 2. When the first tab piece 20 and the second tab piece 40 were bent at an angle perpendicular to the widthwise center line C of the leaf spring body 15 as indicated with the virtual lines, the first tab piece 20 and the second tab piece 40 would approach each other in the width direction of the leaf spring body 15, and thus the above-described clearance could not be sufficiently secured.

The first tab piece 20 and the second tab piece 40 are bent along the lines inclined at the same inclined angle θ with respect to the direction L perpendicular to the widthwise center line C of the leaf spring body 15 in the present embodiment as shown in FIG. 2. Accordingly, the first tab piece 20 and the second tab piece 40 are disposed approximately parallel to each other when made to approach each other in the circumferential direction as shown in FIG. 7.

In the present embodiment, the above-described inclined angle θ is set such that the engaging piece 25 does not protrude from the outer edge on a one-side portion of the leaf spring body 15 in the width direction (see FIG. 2). The inclined angles of the first tab piece and the second tab piece may be set such that the engaging piece does not protrude from the outer edge on a one-side portion of the leaf spring body 15 in the width direction. To be specific, the above-described inclined angle θ in the present embodiment defines an angle at which at least one of the first tab piece, the second tab piece and the engaging piece is bent such that the clearance S increases when at least one of the first tab piece, the second tab piece and the engaging piece is bent in the direction perpendicular to the widthwise center line of the leaf spring body.

The inclined angle θ of the first tab piece 20 may be different from the inclined angle θ of the second tab piece 40. When being bent, the first tab piece 20 and the second tab piece 40 need to be bent in the same bending direction.

In FIG. 3, bending regions R (the shaded regions) at which the first tab piece 20 and the second tab piece 40 can be bent at the predetermined inclined angle θ as described above are indicated.

The first tab piece 20 and the second tab piece 40 are bent at the angle inclined to the direction perpendicular to the widthwise center line C of the leaf spring body 15 in the present embodiment. However, either one of the first tab piece 20 and the second tab piece 40 may be bent at the above-described inclined angle, and further the engaging piece 25 may be bent at the above-described inclined angle. To be specific, only at least one of the first tab piece 20, the second tab piece 40 and the engaging piece 25 needs to be bent at the inclined angle and to extend outward in the width direction of the leaf spring body 15 as described above, so that the side surface of the engaging piece 25 closer to the widthwise center line C and the side surface of the second tab piece 40 around the engagement holding portion 43 closer to the widthwise center line C are separated from each other. The case of bending the engaging piece 25 will be described later in another embodiment (FIGS. 10 to 15).

The engaging piece 25 extends from the first tab piece 20, and the locking portion 30 of the engaging piece 25 is engaged with the second tab piece 40 in the present embodiment. However, the present invention is not limited to the present embodiment. In other words, an engaging piece including a locking portion may be provided to one of the first tab piece and the other-end portion of the leaf spring body, and an engagement holding portion arranged to hold, when the locking portion of the engaging piece is engaged therewith, a state of the engagement may be provided to the other one of the first tab piece and the other-end portion of the leaf spring body. The embodiment where the engaging piece is provided to the other-end portion of the leaf spring body will be described later in yet another embodiment (FIGS. 16 to 23).

Next, a procedure to tighten and fix a flexible hose H made of a material such as rubber to a pipe P such as a pipe with the use of the clamp 10 having the above-described configuration will be described.

The first tab piece 20 and the second tab piece 40 are pinched with the use of the tool T such as pliers and pincers (see FIG. 6) to be clamped in the circumferential direction against elastic restoring force of the leaf spring body 15 from the state where the first tab piece 20 and the second tab piece 40 are separated from each other and the leaf spring body 15 is in the free state of being reduced in diameter as shown in FIG. 1. Then, while the locking portion 30 of the engaging piece 25 is made to protrude toward the outer surface of the second tab piece 40, the leaf spring body 15 is warped in the width direction such that the engaging protrusion 31 of the locking portion 30 matches with the concaved engagement holding portion 43, and the engaging protrusion 31 is engaged with the engagement holding portion 43 (see FIGS. 7 and 8). As a result, the engagement state between the engagement holding portion 43 and the engaging protrusion 31 can be maintained by the engagement holding portion 43. Accordingly, the leaf spring body 15 can be maintained in the radially expanded state while both the end portions of the leaf spring body 15 are warped in the width direction as shown in FIGS. 3 to 9.

In this state, the clamp 10 is disposed on the outer circumference of the hose H mounted on the outer circumference of the one end portion of the pipe P. Then, the first tab piece 20 and the second tab piece 40 are pinched with the use of the tool T such as pliers and pincers as shown FIG. 6, and are made to approach each other in the circumferential direction.

At this time, the first tab piece 20 and the second tab piece 40 are bent at the same inclined angle θ with respect to the direction L perpendicular to the widthwise center line C of the leaf spring body 15 in the present embodiment. Accordingly, the first tab piece 20 and the second tab piece 40 are disposed approximately parallel to each other (see FIG. 7). Thus, the first tab piece 20 and the second tab piece 40 can be made easier to pinch when pinched with the use of a tool T in order to disengage the locking portion 30 of the engaging piece 25 from the engagement holding portion 43 as described above.

In the present embodiment, the inclined angle θ of the first tab piece 20 and the second tab piece 40 is set such that the engaging piece 25 does not protrude from the outer edge on the one-side portion of the leaf spring body 15 in the width direction. Accordingly, the tool T is made less caught by the engaging piece 25 when pinching the first tab piece 20 and the second tab piece 40 in order to disengage the locking portion 30 of the engaging piece 25 from the engagement holding portion 43 as described above. Accordingly, the operation to reduce the diameter of the leaf spring body 15 can be smoothly performed. Since the engaging piece 25 does not protrude from the outer edge on the one-side portion of the leaf spring body 15 in the width direction, the clamp 10 is not prevented from being downsized, which will be described later.

When the first tab piece 20 and the second tab piece 40 are made to approach each other in the circumferential direction by being pinched with the use of a tool T in this manner, the engaging protrusion 31 is disengaged from the engagement holding portion 43.

At this time, the second tab piece 40 is bent at the inclined angle θ with respect to the direction L perpendicular to the widthwise center line C of the leaf spring body 15, and the engagement holding portion 43 has a concave portion (see FIGS. 6 and 7) in the present embodiment. Accordingly, the engaging protrusion 31 of the engaging piece 25 can be easily disengaged from the engagement holding portion 43 so as to slide obliquely therefrom when the first tab piece 20 and the second tab piece 40 are pinched with the use of the tool T in order to reduce the diameter of the leaf spring body 15 in the radially expanded state. Accordingly, the workability to reduce the diameter of the leaf spring body 15 can be improved. Also when the engagement holding portion 43 is a hole, the similar effect can be obtained.

Then, as described above, after the engaging protrusion 31 of the engaging piece 25 is disengaged from the engagement holding portion 43 of the second tab piece 40, when both the tab pieces 20 and 40 are further made to approach each other, the second tab piece 40 is guided while being brought into slidably contact with the tapered portion 27a of the engaging piece 25, and the second tab piece 40 moves in the width direction of the leaf spring body 15 so as to be separated from the locking portion 30 of the engaging piece 25. As a result, the inner side of the second tab piece 40 and the engaging piece 25 are disposed, while having the clearance S therebetween, at positions not to interfere with each other when viewed along the circumferential direction as shown in FIG. 2.

When the tapered portion 27a as described above is not provided, the engaging protrusion 31 of the locking portion 30 of the engaging piece 25 can be disengaged from the engagement holding portion 43 by pinching one side surface of the first tab piece 20 that is opposite to the engaging piece 25 and the protruding piece 41 of the second tab piece 40 with the use of the tool T to displace the second tab piece 40 in the width direction of the leaf spring body 15. In this case, the engaging piece 25 is set so as not to protrude from the outer edge on the one-side portion of the leaf spring body 15 in the width direction. Accordingly, the tool T is made less caught by the engaging piece 25, and the one side surface of the first tab piece 20 and the protruding piece 41 of the second tab piece 40 can be easily pinched. Thus, the operation to reduce the diameter of the leaf spring body 15 can be smoothly performed.

As described above, after the engaging protrusion 31 of the engaging piece 25 is disengaged from the engagement holding portion 43 to move the second tab piece 40 in the width direction so as to be separated from the engaging piece 25, and the second tab piece 40 is disposed at the position not to interfere with the engaging piece 25 of the first tab piece 20, the tool T is gradually opened to open up the space between the first tab piece 20 the second tab piece 40 to release the first tab piece 20 and the second tab piece 40. Then, the insertion piece 35 is made to slide in the slit 18 by elastic restoring force of the leaf spring body 15, whereby the leaf spring body 15 is reduced in diameter to tighten to fix the hose H to the pipe P.

Then, in the clamp 10, when viewed from the radial outer direction in the free state where the leaf spring body 15 is reduced in diameter as shown in FIG. 2, the first tab piece 20 and the second tab piece 40 are bent at the inclined angle θ with respect to the direction L perpendicular to the widthwise center line C of the leaf spring body 15, and extend outward in the width direction of the leaf spring body 15, so that the side surface of the engaging piece 25 closer to the widthwise center line C and the side surface of the second tab piece 40 around the engagement holding portion 43 closer to the widthwise center line C are separated from each other. Accordingly, the clearance S between the inner surface of the second tab piece 40 around the engagement holding portion 43 and the inner surface of the engaging piece 25 that passes by it is sufficiently secured.

As a result, even when the leaf spring body 15 is reduced in width, and the slit 18 where the insertion piece 35 slidably moves is reduced in width, the width of the engaging piece 25 can be secured to obtain a sufficient strength while maintaining the clearance S between the second tab piece 40 and the engaging piece 25. Accordingly, while the clamp 10 can be downsized, the locking portion 30 of the engaging piece 25 can be engaged with the engagement holding portion 43 to firmly maintain the state where the leaf spring body 15 is radially expanded. In addition, the operation to disengage the locking portion 30 of the engaging piece 25 from the engagement holding portion 43 can be reliably performed.

Since the leaf spring body 15 can be reduced in width, the metallic plate of which the leaf spring body 15 is made can be effectively used with economy, which can improve the yield of products.

The clamp 10 is not different from the clamp having the first tab piece 20A and the second tab piece 40A bent at an angle perpendicular to the widthwise center line C of the leaf spring body 15, which are indicated with virtual lines in FIG. 2, in terms of the metallic plates from which the clamps are made. The clamp 10 is different only in that the first tab piece 20 and the second tab piece 40 are bent, as described above, at the inclined angle that is not an angle perpendicular to the widthwise center line C of the leaf spring body 15. Accordingly, the clamp 10 can be produced in a simple method, and can bring down the production cost.

In the present embodiment, the clearance S between the second tab piece 40 and the engaging piece 25 can be secured with the relatively simple configuration in which the first tab piece 20 and the second tab piece 40 are bent at the predetermined inclined angle θ with respect to the direction L perpendicular to the widthwise center line C of the leaf spring body 15. Also when either one of the first tab piece 20 and the second tab piece 40 is bent at the predetermined inclined angle θ, the similar effect can be obtained.

A hose clamp according to another embodiment of the present invention is illustrated in FIGS. 10 to 15. The same reference numerals are provided to the components that are substantially same as those in the above-described embodiment, and explanations of those components are omitted.

Figure 12:
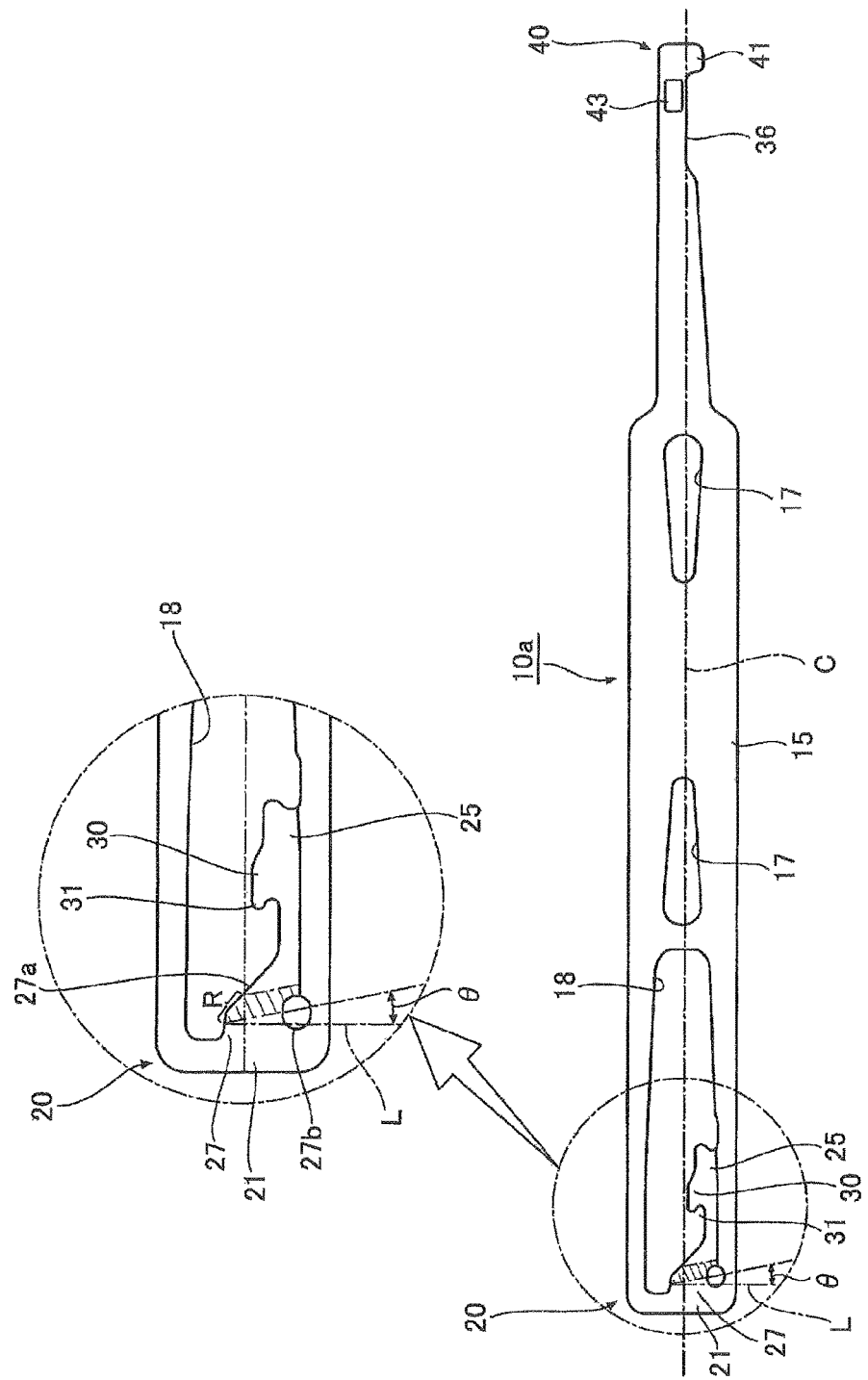
FIG. 12 is an explanatory view of the hose clamp developed into a planar shape.
Figure 13:
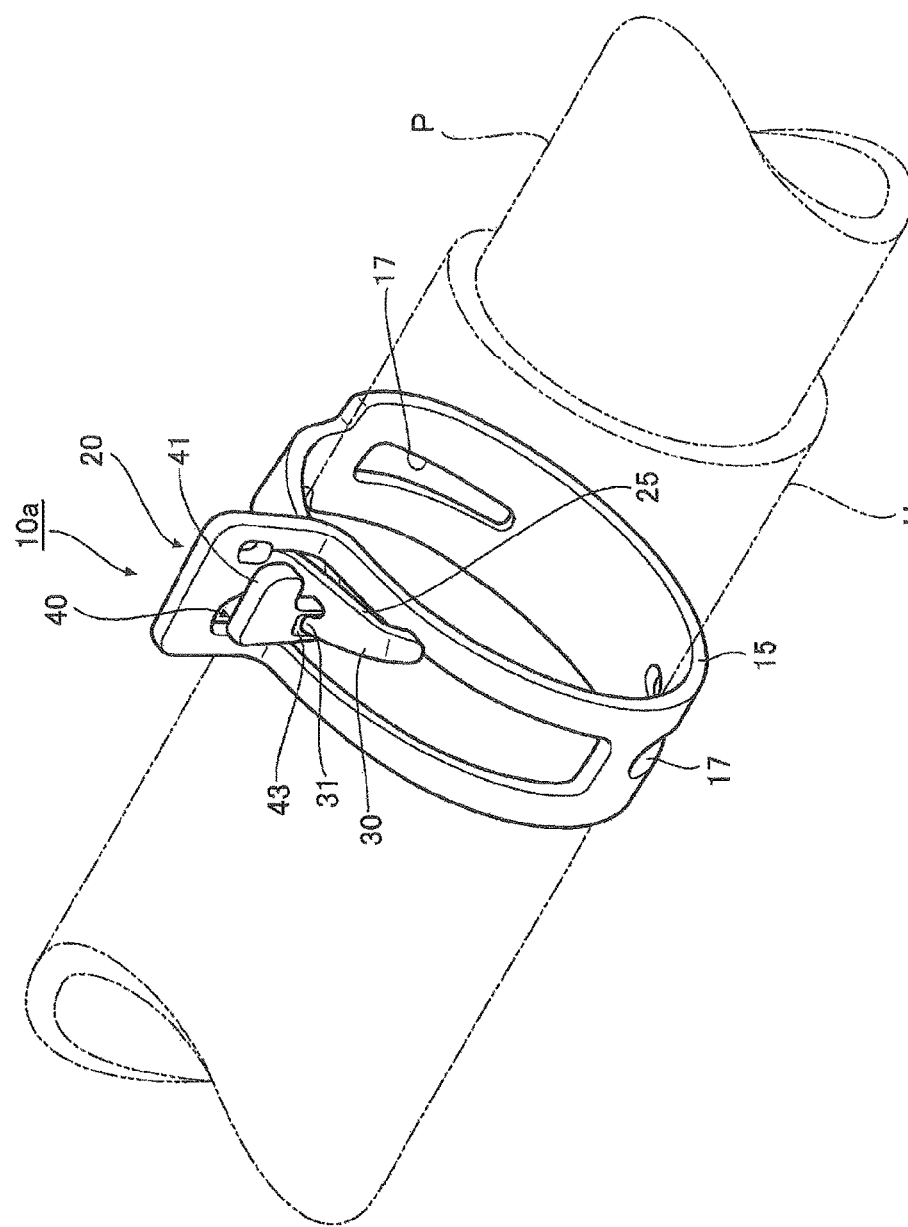
FIG. 13 is a perspective view of the hose clamp in a radially expanded state where an engaging piece is engaged with a second tab piece.
Figure 14:
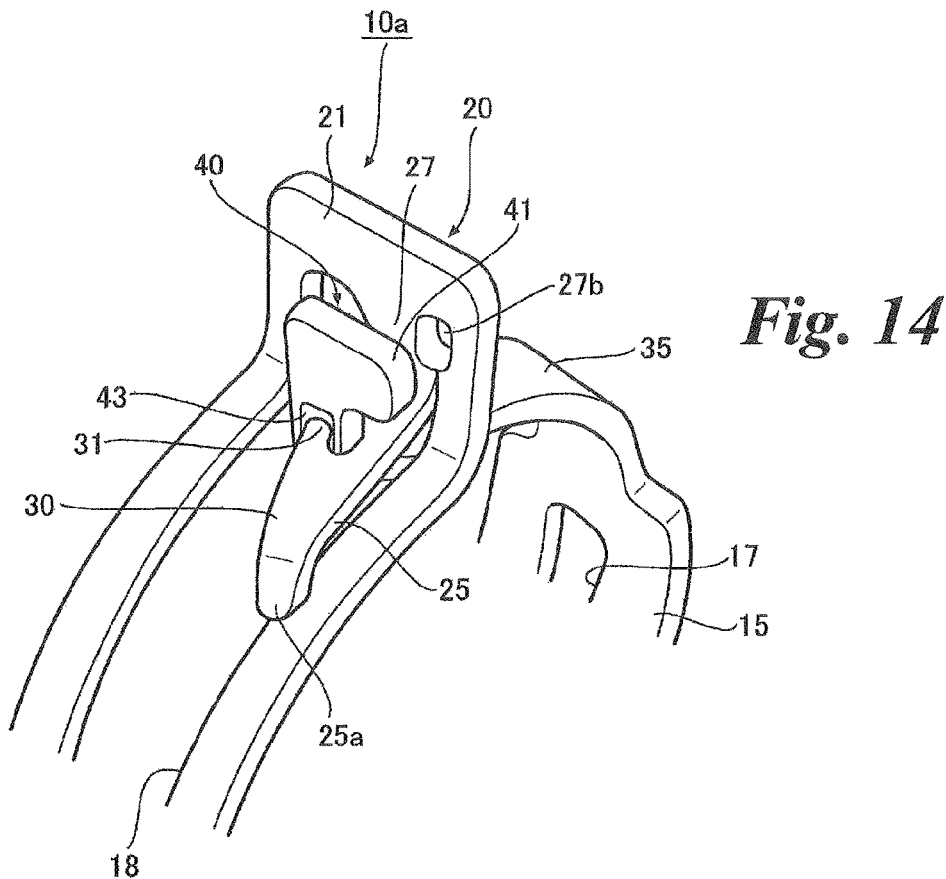
FIG. 14 is an enlarged perspective view of relevant components of the hose clamp in the radially expanded state.
Figure 15:
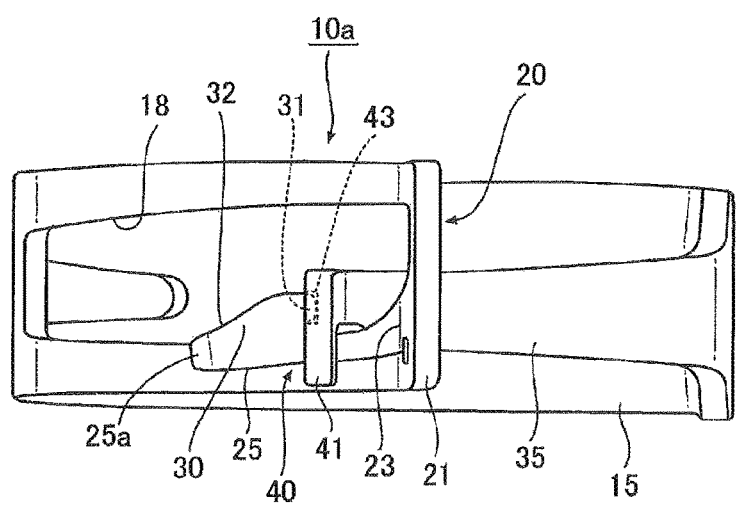
FIG. 15 is a plan view of the hose clamp in the radially expanded state.

In a hose clamp 10a (clamp 10a) according to the present embodiment, when viewed from the radial outer direction in the free state where the leaf spring body 15 is reduced in diameter as shown in FIGS. 12 and 13, the engaging piece 25 is bent at an inclined angle that is not perpendicular to the widthwise center line C of the leaf spring body 15.

Figure 11:
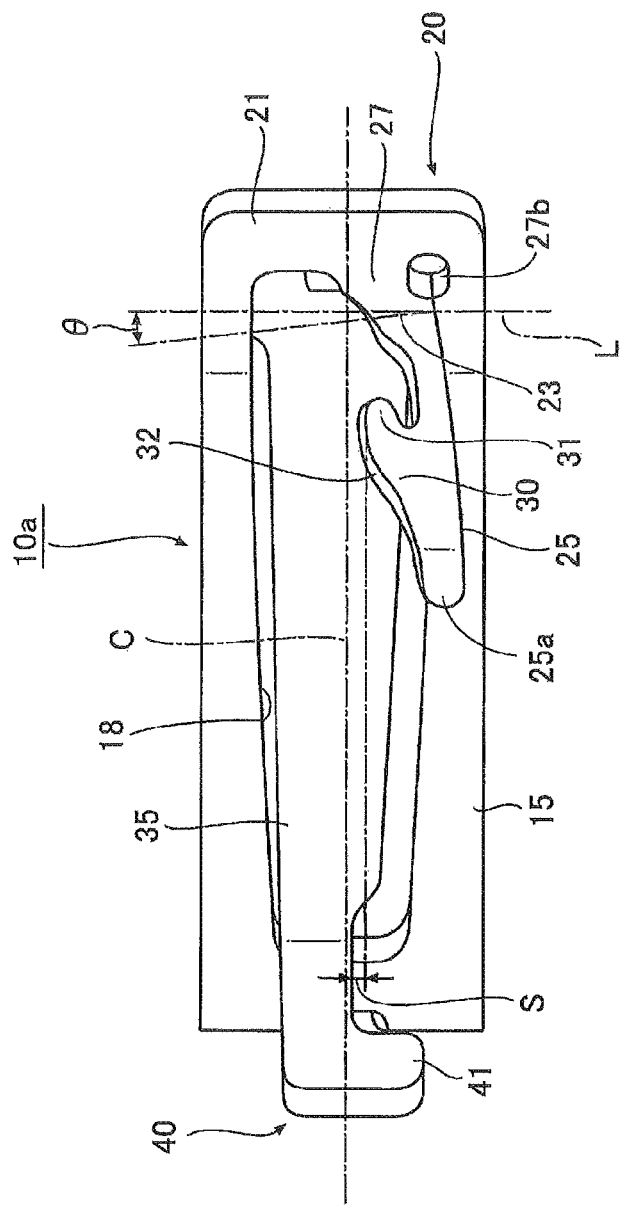
FIG. 11 is a plan view of the hose clamp in the reduced diameter state.

To be specific, the engaging piece 25 extends from the lower surface of the base portion 27 of the first tab piece 20 via the bent portion 23. When L represents the direction perpendicular to the widthwise center line C of the leaf spring body 15 as shown in FIGS. 11 and 12, the engaging piece 25 is bent along the line that is inclined at the predetermined angle θ with respect to the perpendicular direction L while the first tab piece 20 and the second tab piece 40 are bent along the perpendicular direction L in the present embodiment. As a result, the engaging piece 25 extends outward in the width direction of the leaf spring body 15, so that the side surface of the engaging piece 25 closer to the widthwise center line C and the side surface of the second tab piece 40 around the engagement holding portion 43 closer to the widthwise center line C are separated from each other.

In FIG. 12, a bending region R at which the engaging piece 25 can be bent at the predetermined inclined angle θ as described above is indicated.

The hose clamp 10a can be maintained in the radially expanded state while both the end portions of the leaf spring body 15 are warped in the width direction. Because the engagement state can be maintained by the engagement holding portion 43 (see FIGS. 13 to 15) by making the first tab piece 20 and second tab piece 40 approach each other against elastic force from the free state where the leaf spring body 15 is reduced in diameter, moving the engaging piece 25 in the width direction, and engaging the engaging protrusion 31 of the locking portion 30 with the engagement holding portion 43 on the opposite surface of the second tab piece 40.

In this state, when the clamp 10a is disposed on the outer circumference of the hose H, and the first tab piece 20 and the second tab piece 40 are pinched with the use of the tool T to be made to approach each other, similarly to the above-described embodiment, the engaging protrusion 31 of the locking portion 30 is disengaged from the engagement holding portion 43, the second tab piece 40 is guided while being brought into slidably contact with the tapered portion 27a of the engaging piece 25, and the second tab piece 40 moves in the width direction of the leaf spring body 15 so as to be separated from the locking portion 30 of the engaging piece 25. Accordingly, the inner side of the second tab piece 40 and the engaging piece 25 are disposed, while having the clearance S therebetween, at positions not to interfere with each other when viewed along the circumferential direction. By releasing the first tab piece 20 and the second tab piece 40 in this state, the insertion piece 35 is made to slide in the slit 18 by elastic restoring force of the leaf spring body 15, whereby the leaf spring body 15 is reduced in diameter to tighten to fix the hose H to the pipe P.

In the present embodiment, the clearance S between the inner surface of the second tab piece 40 around the engagement holding portion 43 and the inner surface of the engaging piece 25 that passes by it is sufficiently secured with the relatively simple configuration in which the engaging piece 25 is bent at the predetermined inclined angle θ with respect to the direction L perpendicular to the widthwise center line C of the leaf spring body 15 (see FIG. 11). When the above-described inclined angle θ is set such that the engaging piece 25 does not protrude outward from the lateral side of the leaf spring body 15, the leaf spring body 15 is not prevented from being downsized.

A hose clamp according to yet another embodiment of the present invention is illustrated in FIGS. 16 to 22. The same reference numerals are provided to the components that are substantially same as those in the above-described embodiment, and explanations of those components are omitted.

Figure 16:
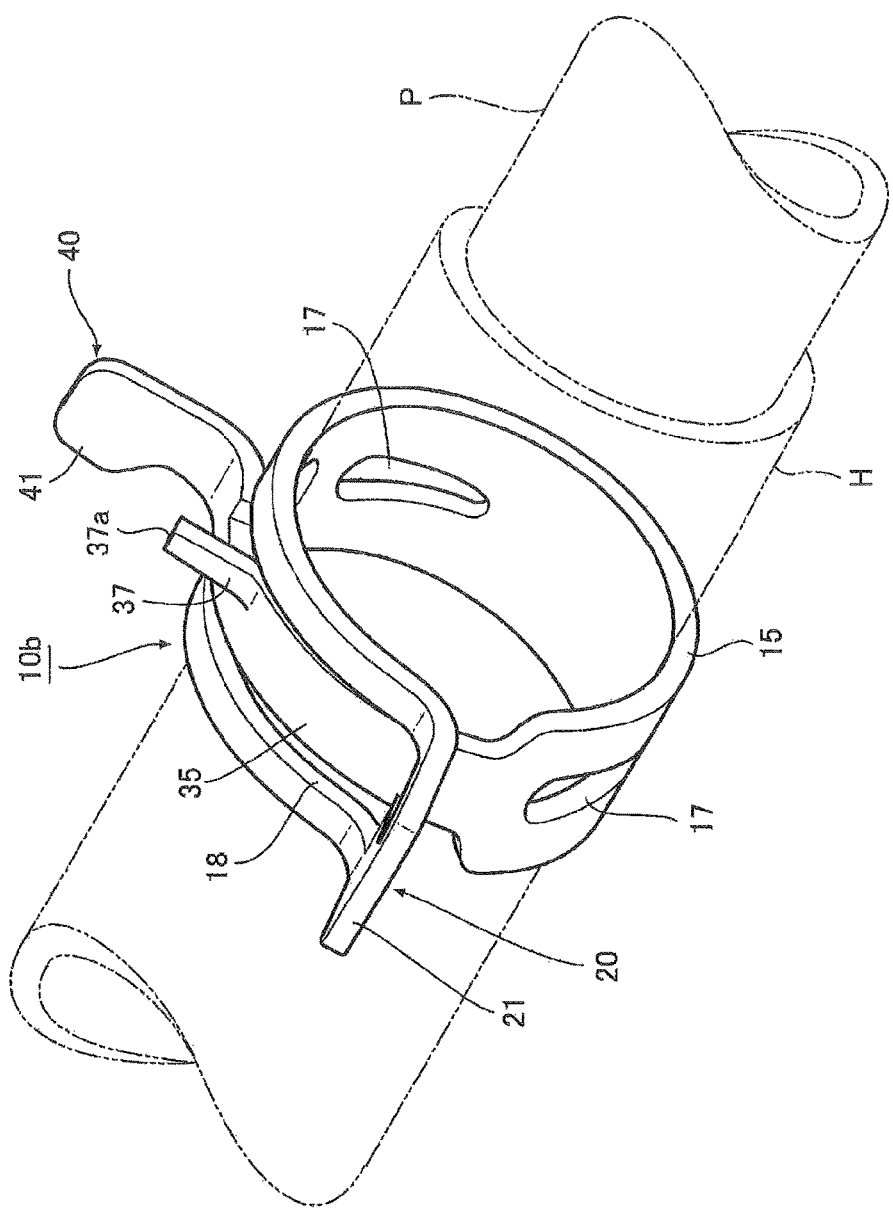
FIG. 16 is a perspective view of a hose clamp according to yet another embodiment of the present invention in a reduced diameter state.
Figure 18:
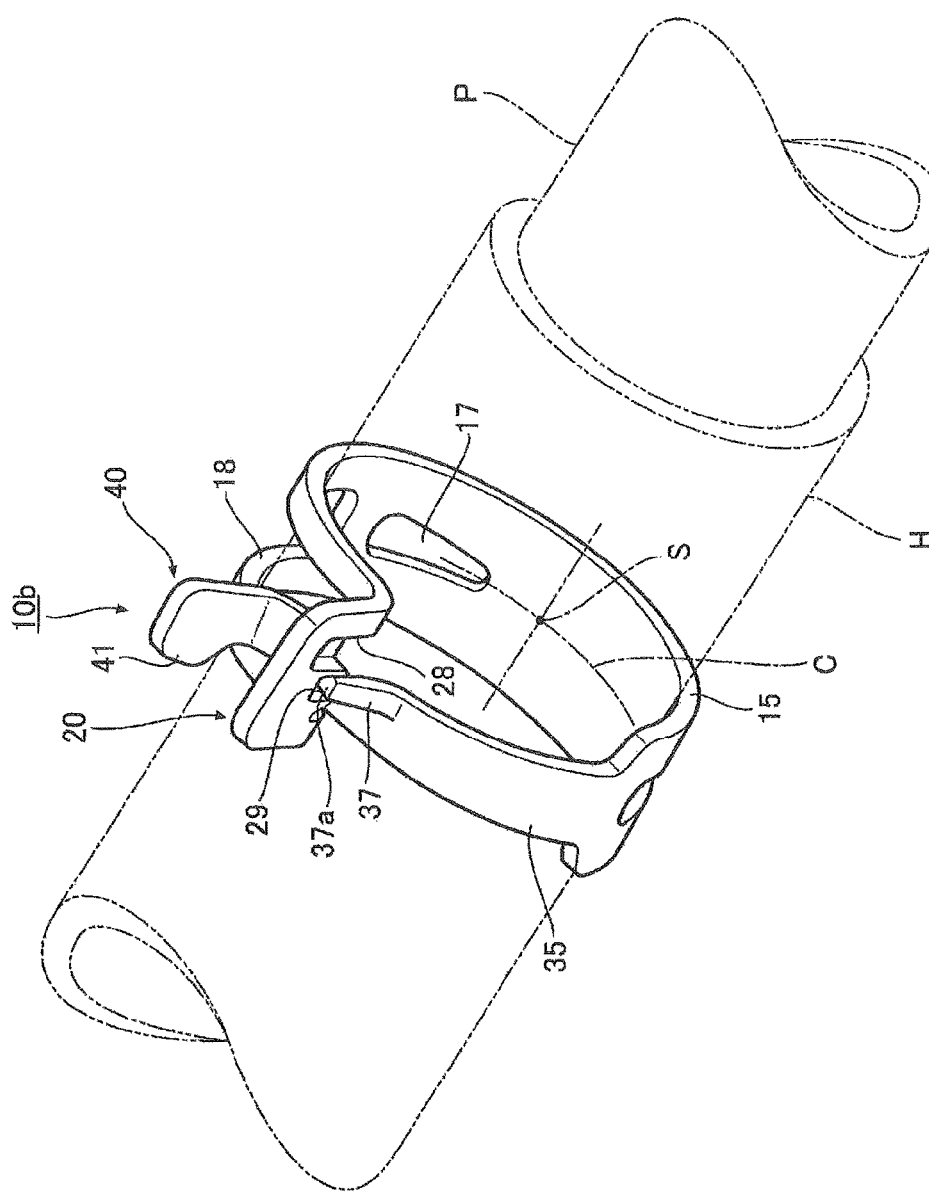
FIG. 18 is a perspective view of the hose clamp in a radially expanded state where an engaging piece is engaged with a second tab piece.

As shown in FIGS. 16 and 18, a hose clamp 10b (clamp 10b) according to the present embodiment includes the insertion piece 35 disposed at the other-end portion of the leaf spring body 15. A part of the insertion piece 35 is erected to provide an engaging piece 37 that includes a locking portion 37a at a distal end portion of the engaging piece 37.

Figure 17:
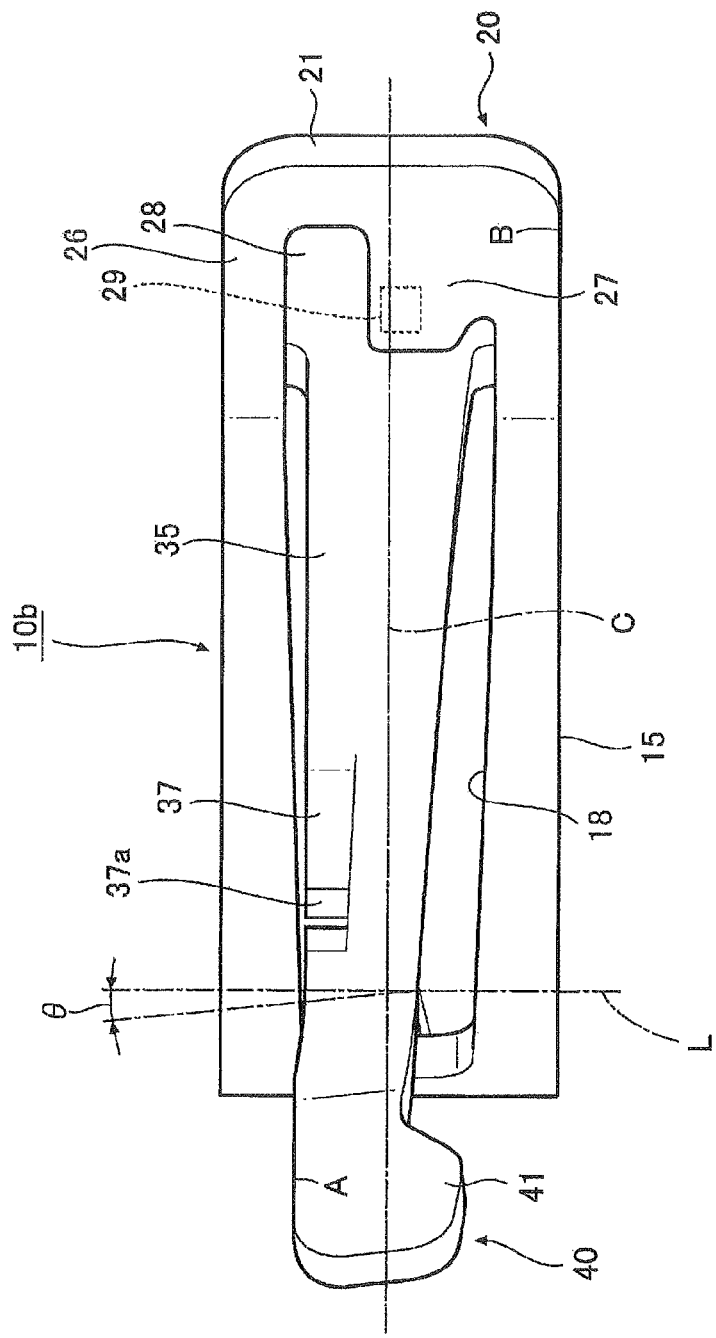
FIG. 17 is a plan view of the hose clamp in the reduced diameter state.

When viewed from the radial outer direction in the free state where the leaf spring body 15 is reduced in diameter as shown in FIG. 17, the engaging piece 37 according to the present embodiment is disposed on the side portion that is opposite in the width direction of the leaf spring body 15 to the portion of the first tab piece 20 where an engagement holding portion 29 is disposed. The engagement holding portion 29 is to be described later As shown in FIGS. 18 and 19, the engagement holding portion 29 is disposed on the surface (outer surface) of the first tab piece 20 that is opposite to the surface facing the second tab piece 40, the engagement holding portion 29 being arranged to hold, when the locking portion 37a of the engaging piece 37 is engaged with the surface of the first tab piece 20, a state of the engagement.

Figure 19:
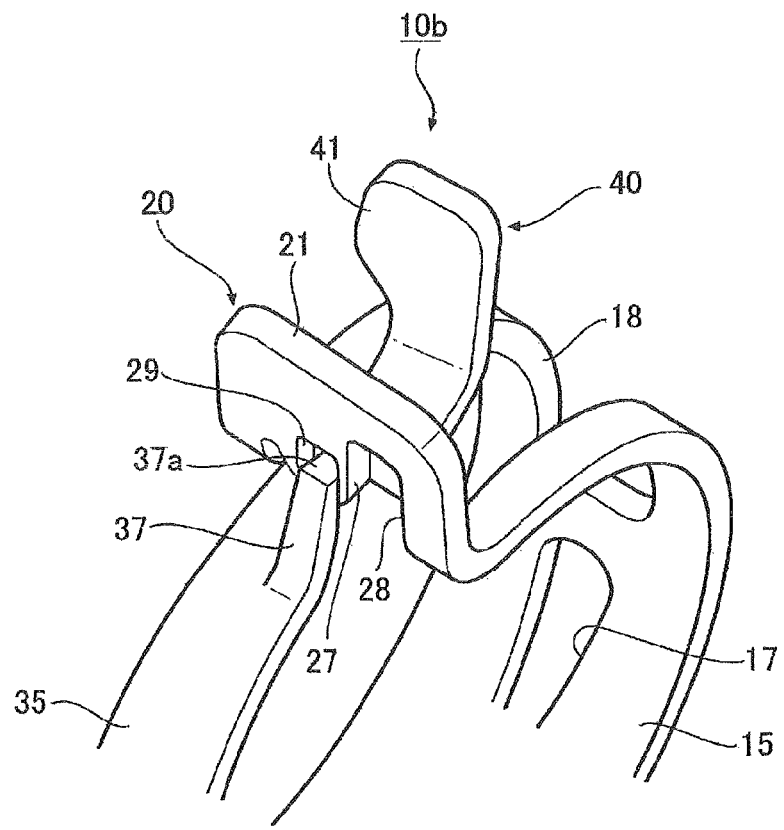
FIG. 19 is an enlarged perspective view of relevant components of the hose clamp in the radially expanded state.
Figure 21:
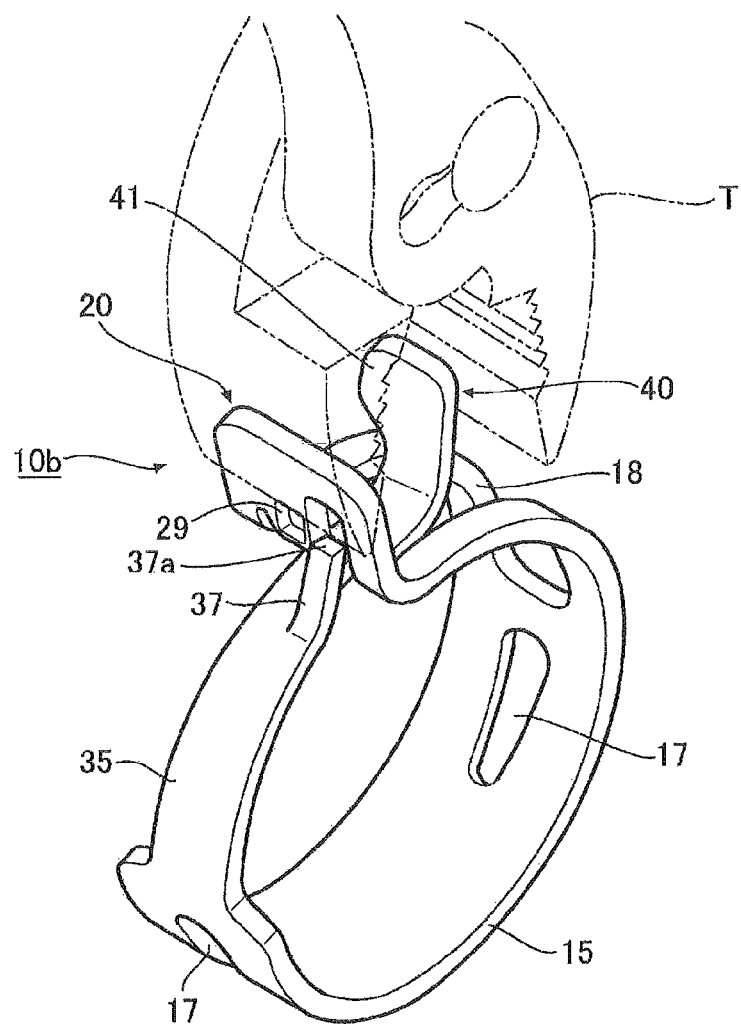
FIG. 21 is a perspective view of the hose clamp showing a state where the engaging piece is disengaged from the second tab piece from the radially expanded state.

As shown in FIGS. 19 and 21, the engagement holding portion 29 is disposed on the outer surface side of the first tab piece 20 at the base portion 27 extending from a position of the lower surface of the upper wall portion 21 of the first tab piece 20, the position being closer to a one-side portion in the width direction. As shown in FIG. 17, a void 28 through which the engaging piece 37 passes is provided between a widthwise one-side piece 26 and the base portion 27 of the arch-shaped first tab piece 20.

In the clamp 10b, when viewed from the radial outer direction in the free state where the leaf spring body 15 is reduced in diameter as shown in FIG. 17, the second tab piece 40 is bent at an inclined angle that is not perpendicular to the widthwise center line C of the leaf spring body 15.

To be specific, as shown in FIG. 17, when L represents the direction perpendicular to the widthwise center line C of the leaf spring body 15, the first tab piece 20 and the engaging piece 37 are bent along the perpendicular direction L. On the other hand, the second tab piece 40 is bent along the line that is inclined at a predetermined angle θ with respect to the perpendicular direction L.

The above-described inclined angle θ in the present embodiment defines an angle at which a side surface A of the second tab piece 40 that is farther from the widthwise center line C of the leaf spring body 15 or a side surface B of the first tab piece 20 that is opposite to the side surface A of the second tab piece 40 is bent so as to be separated from the widthwise center line C of the leaf spring body 15 when at least one of the first tab piece and the second tab piece is bent with respect to the direction perpendicular to the widthwise center line C of the leaf spring body 15.

The first tab piece 20 may be bent at a predetermined angle with respect to the direction L perpendicular to the widthwise center line C of the leaf spring body 15.

The clamp 10b can be maintained in the radially expanded state while both the end portions of the leaf spring body 15 are warped in the width direction. Because the engagement state can be maintained by the engagement holding portion 29 (see FIGS. 18 to 20) by making the first tab piece 20 and second tab piece 40 approach each other against elastic force from the free state where the leaf spring body 15 is reduced in diameter, making the engaging piece 37 pass through the void 28, and moving the engaging piece 37 to the outer surface side of the first tab piece 20 while moving the engaging piece 37 in the width direction, and engaging the locking portion 37a with the engagement holding portion 29 of the first tab piece 20.

Figure 20:
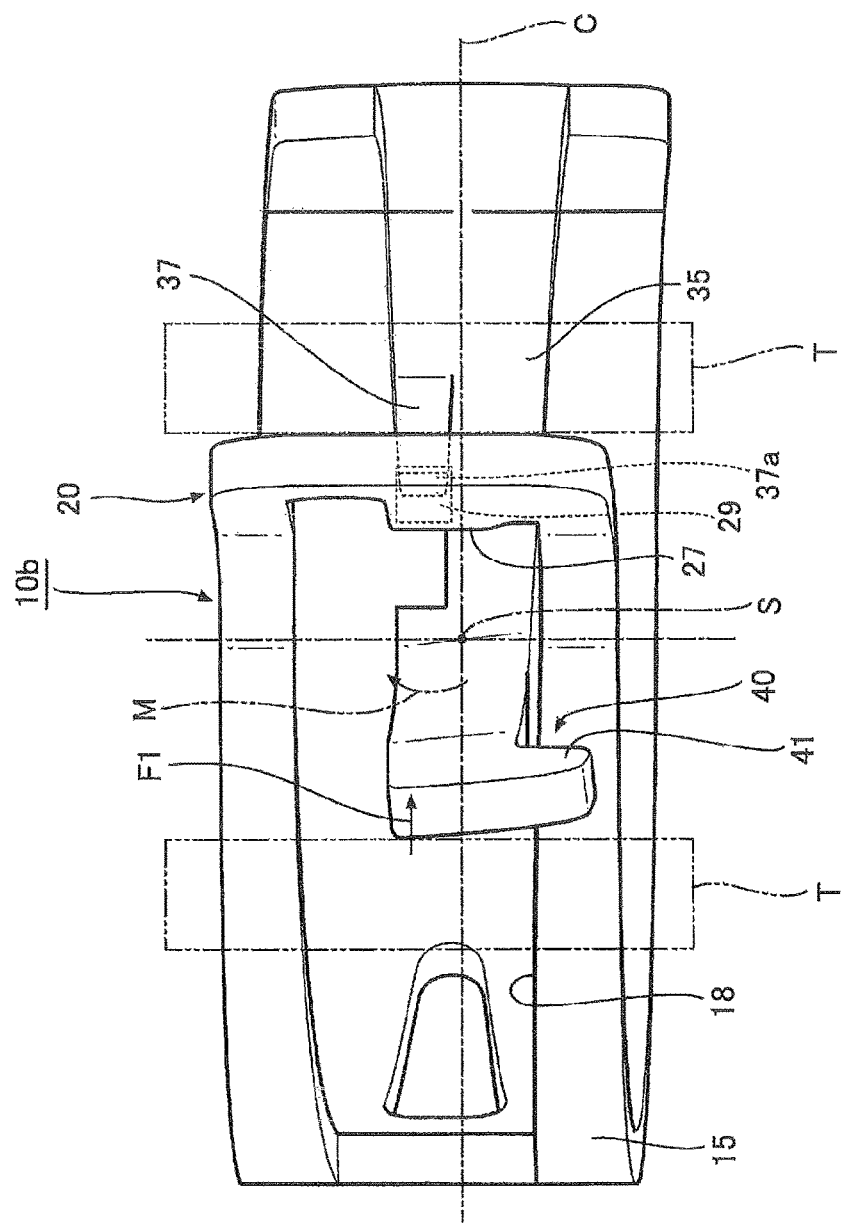
FIG. 20 is a plan view of the hose clamp in the radially expanded state.

In this state, when the clamp 10b is disposed on the outer circumference of the hose H, and the first tab piece 20 and the second tab piece 40 are pinched with the use of the tool T to be made to approach each other, a pinching force F1 exerted on the inclined second tab piece 40 by the tool T acts on the one end portion of the second tab piece 40 in the width direction as shown in FIG. 20.

Then, as shown in FIGS. 18 and 20, bending moment M shown in FIG. 20 acts on the second tab piece 40 around a rotation center S of the second tab piece 40 (on the widthwise center line C of the leaf spring body 15 at the position of the leaf spring body 15 that is facing the second tab piece 40 in the circumferential direction). Accordingly, the second tab piece 40 naturally moves in a direction away from the first tab piece 20 such that disengagement of the locking portion 37a of the engaging piece 37 disposed on the second tab piece 40 from the engagement holding portion 29 disposed on the first tab piece 20 is assisted, which allows both the tab pieces 20 and 40 to move in directions away from each other in the width direction of the leaf spring body 15.

As a result, without providing a structure to assist the disengagement of a locking portion of an engaging piece from an engagement holding portion (e.g., the tapered portion 27a provided to the first tab piece 20 in the above-described embodiment shown in FIG. 1) inside of the slit 18 of the leaf spring body 15, the locking portion 37a of the engaging piece 37 can be disengaged smoothly from the engagement holding portion 29 as shown in FIG. 21. As a result, the leaf spring body 15 can be reduced in width while the width of the piece 37 can be secured to obtain a sufficient strength. Accordingly, while the clamp 10b can be downsized, the locking portion 37a of the engaging piece 37 is engaged with the engagement holding portion 29, which allows the leaf spring body 15 to be reliably maintained in the radially expanded state.

In the present embodiment, a part of the insertion piece 35 disposed at the other-end portion of the leaf spring body 15 is erected to provide the engaging piece 37 that includes a locking portion 37a at its distal end portion, and the engagement holding portion 29 with which the locking portion 37a is engaged is disposed on the surface of the first tab piece 20 that is opposite to the surface facing the second tab piece 40. Accordingly, the engagement structure of the first tab piece 20 and the second tab piece 40 can be made simpler than the engagement structures of the clamps 10 and 10a in the above-described embodiments where the engaging piece 25 extends from the first tab piece 20, and the locking portion 30 of the engaging piece 25 is engaged with the surface of the second tab piece 40 that is opposite to the surface facing the first tab piece 20. Thus, even though the leaf spring body 15 is reduced in width, the width of the engaging piece 37 can be easily secured, which allows the holding strength between the locking portion 37a of the engaging piece 37 and the engagement holding portion 29 to be enhanced.

In the present embodiment, when viewed from the radial outer direction in the free state where the leaf spring body 15 is reduced in diameter as shown in FIG. 17, the engaging piece 37 is disposed on the side portion that is opposite in the width direction of the leaf spring body 15 to the portion of the first tab piece 20 where the engagement holding portion 29 is disposed. Accordingly, the locking portion 37a of the engaging piece 37 is engaged to be held by the engagement holding portion 29. Thus, when pinched with the use of the tool T to be made to approach each other from the state where the leaf spring body 15 is radially expanded, the first tab piece 20 and the second tab piece 40 are made to be easily displaced in directions away from each other in the width direction of the leaf spring body 15 to easily disengage the locking portion 37a of the engaging piece 37 from the engagement holding portion 29. As a result, the leaf spring body 15 can be further reduced in width.

While the engaging piece 37 is provided to the engaging piece 35 disposed at the other-end portion of the leaf spring body 15 to be engaged to be held by the engagement holding portion 29 of the first tab piece 20 in the present embodiment, the present invention is not limited to the present embodiment. For example, an engaging piece having an erected shape may be provided to one of the first tab piece and the second tab piece at the other-end portion of the leaf spring body, and an engagement holding portion having an erected shape similarly that is arranged to be engaged with the engaging piece may be provided to the other one of the first tab piece and the second tab piece at the other-end portion of the leaf spring body.

Figure 22:
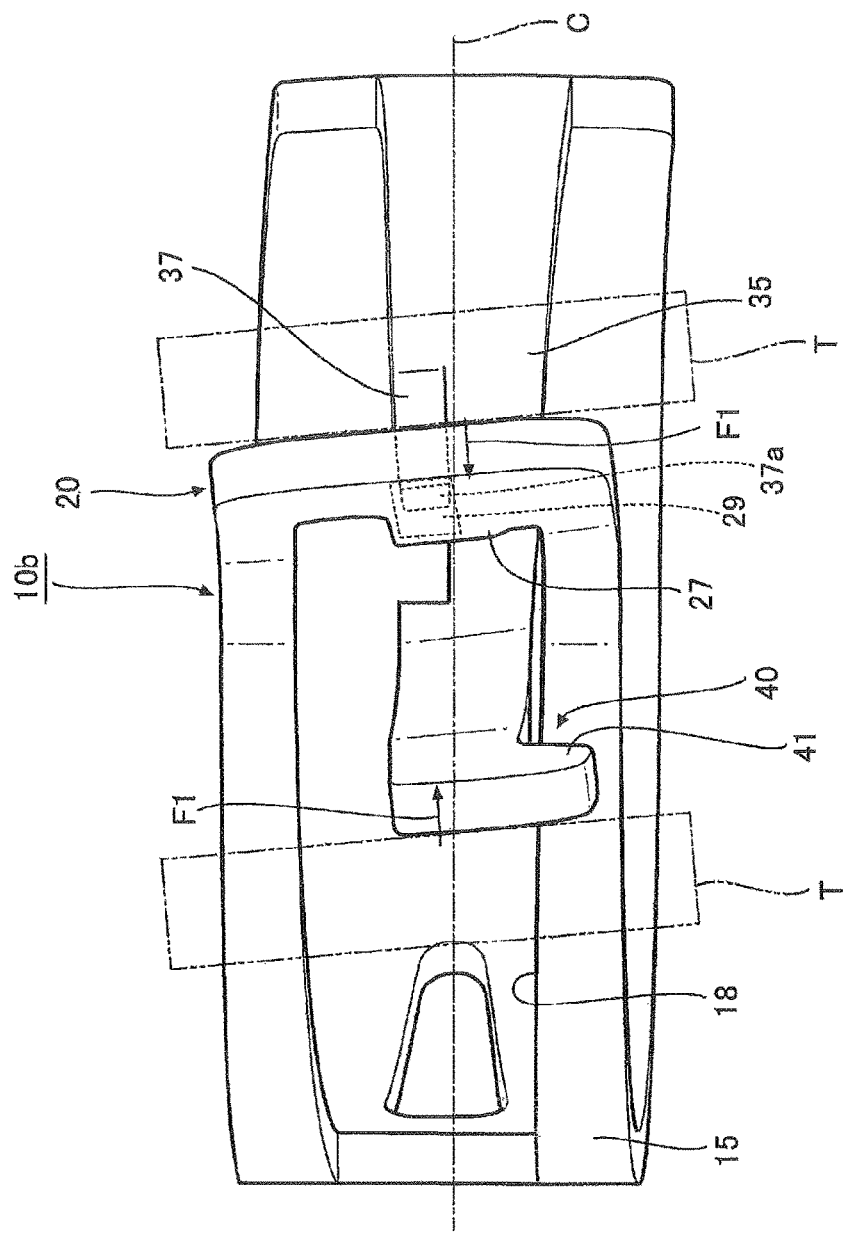
FIG. 22 is an enlarged plan view of relevant components of a modification of the hose clamp.

Only the second tab piece 40 is bent in the present embodiment. However, both of the first tab piece 20 and the second tab piece 40 may be bent at an inclined angle that is not perpendicular to the widthwise center line C of the leaf spring body 15 when viewed from the radial outer direction in the free state where the leaf spring body 15 is reduced in diameter as shown in FIG. 22. In this case, when the clamp 10b is disposed on the outer circumference of the hose H, and the first tab piece 20 and the second tab piece 40 are pinched with the use of the tool T to be made to approach each other, a pinching force F1 by the tool T acts in a direction displaced obliquely outward with respect to the widthwise center line C of the leaf spring body 15 as shown in FIG. 22. Accordingly, both of the tab pieces 20 and 40 move in directions away from each other in the width direction of the leaf spring body 15, and the locking portion 37a of the engaging piece 37 can be disengaged smoothly from the engagement holding portion 29.

Figure 23:
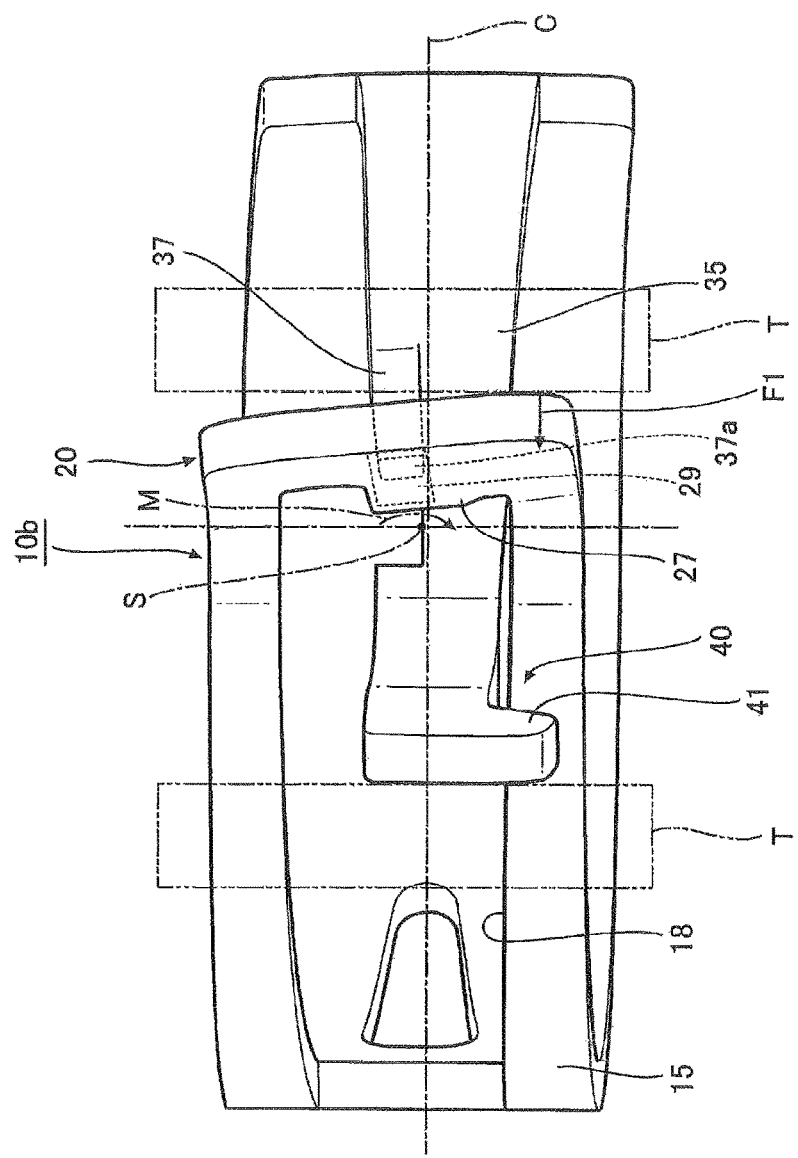
FIG. 23 is an enlarged plan view of relevant components of another modification of the hose clamp.

In the present embodiment, only the first tab piece 20 may be bent at an inclined angle that is not perpendicular to the widthwise center line C of the leaf spring body 15 when viewed from the radial outer direction in the free state where the leaf spring body 15 is reduced in diameter while the second tab piece 40 is not bent as shown in FIG. 23.

In this case, when the clamp 10b is disposed on the outer circumference of the hose H, and the first tab piece 20 and the second tab piece 40 are pinched with the use of the tool T to be made to approach each other, bending moment M shown in FIG. 23 acts on the first tab piece 20 around a rotation center S of the first tab piece 20 (on the widthwise center line C of the leaf spring body 15 at the position of the leaf spring body 15 that is facing the first tab piece 20 in the circumferential direction) as shown in FIG. 23. Accordingly, the first tab piece 20 moves in a direction away from the second tab piece 40, which allows both of the tab pieces 20 and 40 to move in directions away from each other in the width direction of the leaf spring body 15. Also in this case, the locking portion 37a of the engaging piece 37 can be disengaged smoothly from the engagement holding portion 29.

The present invention is not limited to the embodiments described above, and that it is also possible to add a variety of modifications to the embodiments. Such embodiments are also included within the scope of the present invention.

DESCRIPTION OF REFERENCE NUMERALS AND SIGNS 10A, 10B, 10C Hose clamp (Clamp)
15 Leaf spring body
17 Long hole
18 Slit
20 First tab piece
25 Engaging piece
29 Engagement holding portion
30 locking portion
31 Engaging protrusion
35 Insertion piece
37 Engaging piece
37a locking portion
40 Tab piece
43 Engagement holding portion
C Widthwise center line

The invention claimed is:

1. A hose clamp comprising a leaf spring body that is bent to have an annular shape,
wherein a one end portion of the leaf spring body comprises:
a slit formed along a circumferential direction; and
a first tab piece bent in a radial outer direction,
wherein the other-end portion of the leaf spring body comprises:
an insertion piece configured to be inserted into the slit and slidable in the circumferential direction in the slit; and
a second tab piece bent in the radial outer direction from an end portion of the insertion piece and facing the first tab piece,
wherein the leaf spring body is configured to be radially expanded from a free state where the leaf spring body is reduced in diameter, by making the first tab piece and the second tab piece approach each other against an elastic force of the leaf spring body,
wherein the first tab piece comprises:
an engaging piece that extends in the circumferential direction from the first tab piece toward the second tab piece, and comprises a locking portion that protrudes in a width direction of the leaf spring body, and is engageable with a surface of the second tab piece that is opposite to the surface facing the first tab piece,
wherein the second tab piece comprises:
an engagement holding portion that holds an engaged state when the locking portion of the engaging piece is engaged with the engagement holding portion, and is disposed on the surface of the second tab piece that is opposite to the surface facing the first tab piece, and
wherein, when viewed from the radial outer direction in the free state where the leaf spring body is reduced in diameter, at least one of the first tab piece, the second tab piece and the engaging piece is bent at an angle inclined with respect to a direction perpendicular to a widthwise center line of the leaf spring body and extends outward in the width direction, so that a side surface of the engaging piece closer to the widthwise center line and a side surface of the second tab piece around the engagement holding portion closer to the widthwise center line are separated from each other.

2. The hose clamp of claim 1,
wherein, when viewed from the radial outer direction in the free state where the leaf spring body is reduced in diameter, at least one of the first tab piece and the second tab piece is bent at the angle inclined to the direction perpendicular to the widthwise center line of the leaf spring body, and the locking portion of the engaging piece and the engagement holding portion extend outward in the width direction to be separated from each other.

3. The hose clamp of claim 1,
wherein, when viewed from the radial outer direction in the free state where the leaf spring body is reduced in diameter, the engaging piece is bent at the angle inclined to the direction perpendicular to the widthwise center line of the leaf spring body, and the locking portion of the engaging piece and the engagement holding portion extend outward in the width direction to be separated from each other.

4. The hose clamp of claim 1,
wherein the inclined angle of the at least one of the first tab piece, the second tab piece and the engaging piece is set such that the engaging piece does not protrude from an outer edge on a one-side portion of the leaf spring body in the width direction.

5. The hose clamp of claim 1,
wherein the first tab piece and the second tab piece are bent at the same inclined angle inclined to the direction perpendicular to the widthwise center line of the leaf spring body.

6. The hose clamp of claim 1,
wherein the second tab piece is bent at the angle inclined to the direction perpendicular to the widthwise center line of the leaf spring body, and the engagement holding portion of the second tab piece comprises one of a concave portion and a hole.

7. A hose clamp comprising a leaf spring body that is bent to have an annular shape,
wherein a one end portion of the leaf spring body comprises:
a slit formed along a circumferential direction; and
a first tab piece bent in a radial outer direction,
wherein the other-end portion of the leaf spring body comprises:
an insertion piece configured to be inserted into the slit and slidable in the circumferential direction in the slit; and
a second tab piece bent in the radial outer direction from an end portion of the insertion piece and facing the first tab piece,
wherein the leaf spring body is configured to be radially expanded from a free state where the leaf spring body is reduced in diameter, by making the first tab piece and the second tab piece approach each other against an elastic force of the leaf spring body,
wherein the other-end portion of the leaf spring body further comprises:
an engaging piece comprising a locking portion configured to be engaged with the first tab piece,
wherein the first tab piece comprises:
an engagement holding portion configured to hold an engaged state when the locking portion of the engaging piece is engaged with the engagement holding portion, and
wherein, when viewed from the radial outer direction in the free state where the leaf spring body is reduced in diameter, at least one of the first tab piece and the second tab piece is bent at an angle inclined with respect to a direction perpendicular to a widthwise center line of the leaf spring body.

8. The hose clamp of claim 7,
wherein a part of the insertion piece disposed at the other-end portion of the leaf spring body is erected to provide the engaging piece that comprises the locking portion at its distal end portion, and
wherein the engagement holding portion with which the locking portion is engaged is disposed on a surface of the first tab piece that is opposite to a surface facing the second tab piece.

9. The hose clamp of claim 7,
wherein, when viewed from the radial outer direction in the free state where the leaf spring body is reduced in diameter, the engaging piece is disposed on a side portion that is opposite in the width direction of the leaf spring body to a portion of the first tab piece where the engagement holding portion is disposed.

\* \* \* \* \*